US009122674B1

(12) United States Patent
Wong et al.

(10) Patent No.: US 9,122,674 B1
(45) Date of Patent: Sep. 1, 2015

(54) USE OF ANNOTATIONS IN STATISTICAL MACHINE TRANSLATION

(75) Inventors: William Wong, Huntington Beach, CA (US); Manuel Bardea, Mississauga (CA)

(73) Assignee: Language Weaver, Inc., Los Angeles, CA (US)

(*) Notice: Subject to any disclaimer, the term of this patent is extended or adjusted under 35 U.S.C. 154(b) by 731 days.

(21) Appl. No.: 11/640,157

(22) Filed: Dec. 15, 2006

(51) Int. Cl.
*G06F 17/28* (2006.01)

(52) U.S. Cl.
CPC ..................................... *G06F 17/28* (2013.01)

(58) Field of Classification Search
USPC ............................................................ 704/2
See application file for complete search history.

(56) References Cited

U.S. PATENT DOCUMENTS

| | | |
|---|---|---|
| 4,502,128 A | 2/1985 | Okajima et al. |
| 4,599,691 A | 7/1986 | Sakaki et al. |
| 4,615,002 A | 9/1986 | Innes |
| 4,661,924 A | 4/1987 | Okamoto et al. |
| 4,787,038 A | 11/1988 | Doi et al. |
| 4,791,587 A | 12/1988 | Doi |
| 4,800,522 A | 1/1989 | Miyao et al. |
| 4,814,987 A | 3/1989 | Miyao et al. |
| 4,942,526 A | 7/1990 | Okajima et al. |
| 4,980,829 A | 12/1990 | Okajima et al. |
| 5,020,112 A | 5/1991 | Chou |
| 5,088,038 A | 2/1992 | Tanaka et al. |
| 5,091,876 A | 2/1992 | Kumano et al. |
| 5,146,405 A | 9/1992 | Church |
| 5,167,504 A | 12/1992 | Mann |
| 5,175,684 A | 12/1992 | Chong |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,295,068 A | 3/1994 | Nishino et al. |
| 5,302,132 A | 4/1994 | Corder |

(Continued)

FOREIGN PATENT DOCUMENTS

| | | |
|---|---|---|
| CA | 2408819 | 11/2006 |
| CA | 2475857 | 12/2008 |

(Continued)

OTHER PUBLICATIONS

Ueffing et al, Using pos information for statistical machine translation into morphologically rich languages. In EACL '03: Proceedings of the tenth conference on European chapter of the Association for Computational Linguistics, pp. 347-354.*

(Continued)

*Primary Examiner* — Olujimi Adesanya
(74) *Attorney, Agent, or Firm* — Carr & Ferrell LLP

(57) ABSTRACT

A method, system, and computer readable medium for translating a document is provided. A statistical machine translation engine is trained using a translation memory comprising an annotation. A translation rule associated with the annotation is defined. A source document in a source language is received. The source document comprises an instance of the annotation and a string. The string is translated using the statistical machine translation engine. The instance of the annotation is processed according to the translation rule. A target document in a target language is generated based on the translated string and the processed annotation.

46 Claims, 4 Drawing Sheets

(56) References Cited

U.S. PATENT DOCUMENTS

| | | | |
|---|---|---|---|
| 5,311,429 A | 5/1994 | Tominaga | |
| 5,387,104 A | 2/1995 | Corder | |
| 5,408,410 A | 4/1995 | Kaji | |
| 5,432,948 A | 7/1995 | Davis et al. | |
| 5,442,546 A | 8/1995 | Kaji et al. | |
| 5,477,450 A | 12/1995 | Takeda et al. | |
| 5,477,451 A | 12/1995 | Brown et al. | |
| 5,488,725 A | 1/1996 | Turtle et al. | |
| 5,495,413 A | 2/1996 | Kutsumi et al. | |
| 5,497,319 A | 3/1996 | Chong et al. | |
| 5,510,981 A * | 4/1996 | Berger et al. | 704/2 |
| 5,528,491 A | 6/1996 | Kuno et al. | |
| 5,535,120 A | 7/1996 | Chong et al. | |
| 5,541,836 A | 7/1996 | Church et al. | |
| 5,541,837 A | 7/1996 | Fushimoto | |
| 5,548,508 A * | 8/1996 | Nagami | 704/2 |
| 5,587,902 A * | 12/1996 | Kugimiya | 704/2 |
| 5,644,774 A | 7/1997 | Fukumochi et al. | |
| 5,675,815 A | 10/1997 | Yamauchi et al. | |
| 5,687,383 A | 11/1997 | Nakayama et al. | |
| 5,696,980 A | 12/1997 | Brew | |
| 5,724,593 A | 3/1998 | Hargrave, III et al. | |
| 5,752,052 A | 5/1998 | Richardson et al. | |
| 5,754,972 A | 5/1998 | Baker et al. | |
| 5,761,631 A | 6/1998 | Nasukawa | |
| 5,761,689 A | 6/1998 | Rayson et al. | |
| 5,768,603 A | 6/1998 | Brown et al. | |
| 5,779,486 A | 7/1998 | Ho et al. | |
| 5,781,884 A | 7/1998 | Pereira et al. | |
| 5,794,178 A | 8/1998 | Caid et al. | |
| 5,805,832 A | 9/1998 | Brown et al. | |
| 5,806,032 A | 9/1998 | Sproat | |
| 5,819,265 A | 10/1998 | Ravin et al. | |
| 5,826,219 A | 10/1998 | Kutsumi | |
| 5,826,220 A | 10/1998 | Takeda et al. | |
| 5,845,143 A | 12/1998 | Yamauchi et al. | |
| 5,848,385 A | 12/1998 | Poznanski et al. | |
| 5,848,386 A * | 12/1998 | Motoyama | 704/5 |
| 5,850,561 A | 12/1998 | Church et al. | |
| 5,855,015 A | 12/1998 | Shoham | |
| 5,864,788 A | 1/1999 | Kutsumi | |
| 5,867,811 A | 2/1999 | O'Donoghue | |
| 5,870,706 A | 2/1999 | Alshawi | |
| 5,893,134 A | 4/1999 | O'Donoghue et al. | |
| 5,903,858 A | 5/1999 | Saraki | |
| 5,907,821 A | 5/1999 | Kaji et al. | |
| 5,909,681 A | 6/1999 | Passera et al. | |
| 5,930,746 A | 7/1999 | Ting | |
| 5,963,205 A | 10/1999 | Sotomayor | |
| 5,966,685 A | 10/1999 | Flanagan et al. | |
| 5,966,686 A | 10/1999 | Heidorn et al. | |
| 5,983,169 A | 11/1999 | Kozma | |
| 5,987,402 A | 11/1999 | Murata et al. | |
| 5,987,404 A | 11/1999 | Della Pietra et al. | |
| 5,991,710 A | 11/1999 | Papineni et al. | |
| 5,995,922 A | 11/1999 | Penteroudakis et al. | |
| 6,018,617 A | 1/2000 | Sweitzer et al. | |
| 6,031,984 A | 2/2000 | Walser | |
| 6,032,111 A | 2/2000 | Mohri | |
| 6,047,252 A | 4/2000 | Kumano et al. | |
| 6,064,819 A | 5/2000 | Franssen et al. | |
| 6,064,951 A | 5/2000 | Park et al. | |
| 6,073,143 A * | 6/2000 | Nishikawa et al. | 715/207 |
| 6,077,085 A | 6/2000 | Parry et al. | |
| 6,092,034 A | 7/2000 | McCarley et al. | |
| 6,119,077 A | 9/2000 | Shinozaki | |
| 6,119,078 A | 9/2000 | Kobayakawa et al. | |
| 6,131,082 A | 10/2000 | Hargrave, III et al. | |
| 6,161,082 A | 12/2000 | Goldberg et al. | |
| 6,182,014 B1 | 1/2001 | Kenyon et al. | |
| 6,182,027 B1 | 1/2001 | Nasukawa et al. | |
| 6,185,524 B1 | 2/2001 | Carus et al. | |
| 6,205,456 B1 | 3/2001 | Nakao | |
| 6,206,700 B1 | 3/2001 | Brown et al. | |
| 6,223,150 B1 | 4/2001 | Duan et al. | |
| 6,233,544 B1 | 5/2001 | Alshawi | |
| 6,233,545 B1 | 5/2001 | Datig | |
| 6,233,546 B1 | 5/2001 | Datig | |
| 6,236,958 B1 | 5/2001 | Lange et al. | |
| 6,269,351 B1 | 7/2001 | Black | |
| 6,275,789 B1 | 8/2001 | Moser et al. | |
| 6,278,967 B1 | 8/2001 | Akers et al. | |
| 6,278,969 B1 | 8/2001 | King et al. | |
| 6,285,978 B1 | 9/2001 | Bernth et al. | |
| 6,289,302 B1 | 9/2001 | Kuo | |
| 6,304,841 B1 | 10/2001 | Berger et al. | |
| 6,311,152 B1 | 10/2001 | Bai et al. | |
| 6,317,708 B1 | 11/2001 | Witbrock et al. | |
| 6,327,568 B1 | 12/2001 | Joost | |
| 6,330,529 B1 * | 12/2001 | Ito | 704/3 |
| 6,330,530 B1 | 12/2001 | Horiguchi et al. | |
| 6,356,864 B1 | 3/2002 | Foltz et al. | |
| 6,360,196 B1 | 3/2002 | Poznanski et al. | |
| 6,389,387 B1 | 5/2002 | Poznanski et al. | |
| 6,393,388 B1 | 5/2002 | Franz et al. | |
| 6,393,389 B1 | 5/2002 | Chanod et al. | |
| 6,415,250 B1 | 7/2002 | van den Akker | |
| 6,460,015 B1 | 10/2002 | Hetherington et al. | |
| 6,470,306 B1 * | 10/2002 | Pringle et al. | 704/3 |
| 6,473,729 B1 | 10/2002 | Gastaldo et al. | |
| 6,473,896 B1 | 10/2002 | Hicken et al. | |
| 6,480,698 B2 | 11/2002 | Ho et al. | |
| 6,490,549 B1 | 12/2002 | Ulicny et al. | |
| 6,498,921 B1 | 12/2002 | Ho et al. | |
| 6,502,064 B1 | 12/2002 | Miyahira et al. | |
| 6,529,865 B1 | 3/2003 | Duan et al. | |
| 6,535,842 B1 | 3/2003 | Roche et al. | |
| 6,587,844 B1 | 7/2003 | Mohri | |
| 6,598,046 B1 | 7/2003 | Goldberg et al. | |
| 6,604,101 B1 | 8/2003 | Chan et al. | |
| 6,609,087 B1 | 8/2003 | Miller et al. | |
| 6,647,364 B1 | 11/2003 | Yumura et al. | |
| 6,691,279 B2 | 2/2004 | Yoden et al. | |
| 6,745,161 B1 | 6/2004 | Arnold et al. | |
| 6,745,176 B2 | 6/2004 | Probert, Jr. et al. | |
| 6,757,646 B2 | 6/2004 | Marchisio | |
| 6,778,949 B2 | 8/2004 | Duan et al. | |
| 6,782,356 B1 | 8/2004 | Lopke | |
| 6,810,374 B2 | 10/2004 | Kang | |
| 6,848,080 B1 | 1/2005 | Lee et al. | |
| 6,857,022 B1 | 2/2005 | Scanlan | |
| 6,885,985 B2 | 4/2005 | Hull | |
| 6,901,361 B1 | 5/2005 | Portilla | |
| 6,904,402 B1 | 6/2005 | Wang et al. | |
| 6,910,003 B1 | 6/2005 | Arnold et al. | |
| 6,952,665 B1 | 10/2005 | Shimomura et al. | |
| 6,983,239 B1 | 1/2006 | Epstein | |
| 6,993,473 B2 | 1/2006 | Cartus | |
| 6,996,518 B2 | 2/2006 | Jones et al. | |
| 6,996,520 B2 | 2/2006 | Levin | |
| 6,999,925 B2 | 2/2006 | Fischer et al. | |
| 7,013,262 B2 | 3/2006 | Tokuda et al. | |
| 7,016,827 B1 | 3/2006 | Ramaswamy et al. | |
| 7,016,977 B1 | 3/2006 | Dunsmoir et al. | |
| 7,024,351 B2 | 4/2006 | Wang | |
| 7,031,911 B2 | 4/2006 | Zhou et al. | |
| 7,050,964 B2 | 5/2006 | Menzes et al. | |
| 7,054,803 B2 | 5/2006 | Eisele | |
| 7,085,708 B2 | 8/2006 | Manson | |
| 7,089,493 B2 | 8/2006 | Hatori et al. | |
| 7,103,531 B2 | 9/2006 | Moore | |
| 7,107,204 B1 | 9/2006 | Liu et al. | |
| 7,107,215 B2 | 9/2006 | Ghali | |
| 7,113,903 B1 | 9/2006 | Riccardi et al. | |
| 7,143,036 B2 | 11/2006 | Weise | |
| 7,146,358 B1 | 12/2006 | Gravano et al. | |
| 7,149,688 B2 | 12/2006 | Schalkwyk | |
| 7,171,348 B2 | 1/2007 | Scanlan | |
| 7,174,289 B2 | 2/2007 | Sukehiro | |
| 7,177,792 B2 | 2/2007 | Knight et al. | |
| 7,191,115 B2 | 3/2007 | Moore | |
| 7,194,403 B2 | 3/2007 | Okura et al. | |
| 7,197,451 B1 | 3/2007 | Carter et al. | |
| 7,200,550 B2 | 4/2007 | Menezes et al. | |

(56) References Cited

U.S. PATENT DOCUMENTS

| | | |
|---|---|---|
| 7,206,736 B2 | 4/2007 | Moore |
| 7,209,875 B2 | 4/2007 | Quirk et al. |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,283,950 B2 | 10/2007 | Pournasseh et al. |
| 7,295,962 B2 | 11/2007 | Marcu |
| 7,295,963 B2 | 11/2007 | Richardson et al. |
| 7,302,392 B1 | 11/2007 | Thenthiruperai et al. |
| 7,319,949 B2 | 1/2008 | Pinkham |
| 7,328,156 B2 | 2/2008 | Meliksetian et al. |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 | 3/2008 | Coffman et al. |
| 7,356,457 B2 | 4/2008 | Pinkham et al. |
| 7,369,998 B2 | 5/2008 | Sarich et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,234 B2 | 6/2008 | Schmid et al. |
| 7,403,890 B2 | 7/2008 | Roushar |
| 7,409,332 B2 | 8/2008 | Moore |
| 7,409,333 B2 | 8/2008 | Wilkinson et al. |
| 7,447,623 B2 | 11/2008 | Appleby |
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 * | 6/2009 | Brockett et al. .................. 704/9 |
| 7,552,053 B2 | 6/2009 | Gao et al. |
| 7,565,281 B2 | 7/2009 | Appleby |
| 7,574,347 B2 | 8/2009 | Wang |
| 7,580,828 B2 | 8/2009 | D'Agostini |
| 7,580,830 B2 | 8/2009 | Al-Onaizan et al. |
| 7,584,092 B2 | 9/2009 | Brockett et al. |
| 7,587,307 B2 | 9/2009 | Cancedda et al. |
| 7,620,538 B2 | 11/2009 | Marcu et al. |
| 7,620,632 B2 | 11/2009 | Andrews |
| 7,624,005 B2 | 11/2009 | Koehn et al. |
| 7,624,020 B2 | 11/2009 | Yamada et al. |
| 7,627,479 B2 | 12/2009 | Travieso et al. |
| 7,636,656 B1 * | 12/2009 | Nieh .................................. 704/2 |
| 7,680,646 B2 * | 3/2010 | Lux-Pogodalla et al. ........ 704/2 |
| 7,689,405 B2 | 3/2010 | Marcu |
| 7,698,124 B2 | 4/2010 | Menezes et al. |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,801,720 B2 | 9/2010 | Satake et al. |
| 7,813,918 B2 | 10/2010 | Muslea et al. |
| 7,822,596 B2 | 10/2010 | Elgazzar et al. |
| 7,925,494 B2 | 4/2011 | Cheng et al. |
| 7,957,953 B2 | 6/2011 | Moore |
| 7,974,833 B2 | 7/2011 | Soricut et al. |
| 7,974,976 B2 | 7/2011 | Yahia et al. |
| 8,060,360 B2 | 11/2011 | He |
| 8,145,472 B2 | 3/2012 | Shore et al. |
| 8,214,196 B2 | 7/2012 | Yamada et al. |
| 8,219,382 B2 | 7/2012 | Kim et al. |
| 8,234,106 B2 | 7/2012 | Marcu et al. |
| 8,244,519 B2 | 8/2012 | Bicici et al. |
| 8,249,854 B2 | 8/2012 | Nikitin et al. |
| 8,265,923 B2 | 9/2012 | Chatterjee et al. |
| 8,275,600 B2 | 9/2012 | Bilac et al. |
| 8,296,127 B2 | 10/2012 | Marcu et al. |
| 8,315,850 B2 | 11/2012 | Furuuchi et al. |
| 8,326,598 B1 | 12/2012 | Macherey et al. |
| 8,380,486 B2 | 2/2013 | Soricut et al. |
| 8,433,556 B2 | 4/2013 | Fraser et al. |
| 8,442,813 B1 | 5/2013 | Popat |
| 8,468,149 B1 | 6/2013 | Lung et al. |
| 8,504,351 B2 | 8/2013 | Waibel et al. |
| 8,543,563 B1 | 9/2013 | Nikoulina et al. |
| 8,548,794 B2 | 10/2013 | Koehn |
| 8,600,728 B2 | 12/2013 | Knight et al. |
| 8,615,389 B1 | 12/2013 | Marcu |
| 8,655,642 B2 | 2/2014 | Fux |
| 8,666,725 B2 | 3/2014 | Och |
| 8,676,563 B2 | 3/2014 | Soricut et al. |
| 8,694,303 B2 | 4/2014 | Hopkins et al. |
| 8,762,128 B1 | 6/2014 | Brants et al. |
| 8,825,466 B1 | 9/2014 | Wang et al. |
| 8,831,928 B2 | 9/2014 | Marcu et al. |
| 8,886,515 B2 | 11/2014 | Van Assche |
| 8,886,517 B2 | 11/2014 | Soricut et al. |
| 8,886,518 B1 | 11/2014 | Wang et al. |
| 8,942,973 B2 | 1/2015 | Viswanathan |
| 8,943,080 B2 | 1/2015 | Marcu et al. |
| 8,977,536 B2 | 3/2015 | Och |
| 8,990,064 B2 | 3/2015 | Marcu et al. |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 * | 1/2002 | Fuji .................................... 704/2 |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0059566 A1 | 5/2002 | Delcambre et al. |
| 2002/0078091 A1 | 6/2002 | Vu et al. |
| 2002/0083029 A1 | 6/2002 | Chun et al. |
| 2002/0087313 A1 | 7/2002 | Lee et al. |
| 2002/0099744 A1 | 7/2002 | Coden et al. |
| 2002/0107683 A1 | 8/2002 | Eisele |
| 2002/0111788 A1 | 8/2002 | Kimpara |
| 2002/0111789 A1 | 8/2002 | Hull |
| 2002/0111967 A1 | 8/2002 | Nagase |
| 2002/0143537 A1 | 10/2002 | Ozawa et al. |
| 2002/0152063 A1 * | 10/2002 | Tokieda et al. .................. 704/2 |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0009322 A1 | 1/2003 | Marcu |
| 2003/0023423 A1 | 1/2003 | Yamada et al. |
| 2003/0040900 A1 | 2/2003 | D'Agostini |
| 2003/0061022 A1 | 3/2003 | Reinders |
| 2003/0129571 A1 | 7/2003 | Kim |
| 2003/0144832 A1 | 7/2003 | Harris |
| 2003/0154071 A1 | 8/2003 | Shreve |
| 2003/0158723 A1 * | 8/2003 | Masuichi et al. .................. 704/4 |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0204400 A1 | 10/2003 | Marcu et al. |
| 2003/0216905 A1 | 11/2003 | Chelba et al. |
| 2003/0217052 A1 | 11/2003 | Rubenczyk et al. |
| 2003/0233222 A1 * | 12/2003 | Soricut et al. .................... 704/2 |
| 2004/0006560 A1 | 1/2004 | Chan et al. |
| 2004/0015342 A1 | 1/2004 | Garst |
| 2004/0023193 A1 | 2/2004 | Wen et al. |
| 2004/0024581 A1 | 2/2004 | Koehn et al. |
| 2004/0030551 A1 | 2/2004 | Marcu et al. |
| 2004/0035055 A1 | 2/2004 | Zhu et al. |
| 2004/0044530 A1 | 3/2004 | Moore |
| 2004/0059708 A1 | 3/2004 | Dean et al. |
| 2004/0068411 A1 * | 4/2004 | Scanlan ........................ 704/277 |
| 2004/0098247 A1 | 5/2004 | Moore |
| 2004/0102956 A1 | 5/2004 | Levin |
| 2004/0102957 A1 | 5/2004 | Levin |
| 2004/0111253 A1 | 6/2004 | Luo et al. |
| 2004/0115597 A1 | 6/2004 | Butt |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson et al. |

(56) References Cited

U.S. PATENT DOCUMENTS

| | | |
|---|---|---|
| 2005/0021322 A1 | 1/2005 | Richardson et al. |
| 2005/0021323 A1 | 1/2005 | Li |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0055199 A1 | 3/2005 | Ryzchachkin et al. |
| 2005/0055217 A1 | 3/2005 | Sumita et al. |
| 2005/0060160 A1* | 3/2005 | Roh et al. .................. 704/277 |
| 2005/0075858 A1 | 4/2005 | Pournasseh et al. |
| 2005/0086226 A1 | 4/2005 | Krachman |
| 2005/0102130 A1 | 5/2005 | Quirk et al. |
| 2005/0125218 A1 | 6/2005 | Rajput et al. |
| 2005/0149315 A1* | 7/2005 | Flanagan et al. .............. 704/2 |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2005/0267738 A1 | 12/2005 | Wilkinson et al. |
| 2006/0004563 A1 | 1/2006 | Campbell et al. |
| 2006/0015320 A1* | 1/2006 | Och .................................. 704/2 |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0041428 A1 | 2/2006 | Fritsch et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0136824 A1 | 6/2006 | Lin |
| 2006/0142995 A1 | 6/2006 | Knight et al. |
| 2006/0150069 A1 | 7/2006 | Chang |
| 2006/0165040 A1 | 7/2006 | Rathod et al. |
| 2006/0167984 A1 | 7/2006 | Fellenstein et al. |
| 2006/0190241 A1 | 8/2006 | Goutte et al. |
| 2007/0015121 A1 | 1/2007 | Johnson et al. |
| 2007/0016400 A1 | 1/2007 | Soricutt et al. |
| 2007/0016401 A1* | 1/2007 | Ehsani et al. .................. 704/9 |
| 2007/0033001 A1 | 2/2007 | Muslea et al. |
| 2007/0043553 A1 | 2/2007 | Dolan |
| 2007/0050182 A1 | 3/2007 | Sneddon et al. |
| 2007/0078654 A1 | 4/2007 | Moore |
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168202 A1 | 7/2007 | Changela et al. |
| 2007/0168450 A1 | 7/2007 | Prajapat et al. |
| 2007/0180373 A1 | 8/2007 | Bauman et al. |
| 2007/0208719 A1 | 9/2007 | Tran |
| 2007/0219774 A1 | 9/2007 | Quirk et al. |
| 2007/0233460 A1 | 10/2007 | Lancaster et al. |
| 2007/0233547 A1 | 10/2007 | Younger et al. |
| 2007/0250306 A1 | 10/2007 | Marcu et al. |
| 2007/0265825 A1 | 11/2007 | Cancedda et al. |
| 2007/0265826 A1 | 11/2007 | Chen et al. |
| 2007/0269775 A1 | 11/2007 | Andreev et al. |
| 2007/0294076 A1 | 12/2007 | Shore et al. |
| 2008/0040095 A1 | 2/2008 | Sinha et al. |
| 2008/0052061 A1 | 2/2008 | Kim et al. |
| 2008/0065478 A1 | 3/2008 | Kohlmeier et al. |
| 2008/0109209 A1 | 5/2008 | Fraser et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0195461 A1 | 8/2008 | Li et al. |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0300857 A1 | 12/2008 | Barbaiani et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0106017 A1 | 4/2009 | D'Agostini |
| 2009/0119091 A1 | 5/2009 | Sarig |
| 2009/0125497 A1 | 5/2009 | Jiang et al. |
| 2009/0198487 A1 | 8/2009 | Wong et al. |
| 2009/0234634 A1 | 9/2009 | Chen et al. |
| 2009/0234635 A1 | 9/2009 | Bhatt et al. |
| 2009/0241115 A1 | 9/2009 | Raffo et al. |
| 2009/0248662 A1 | 10/2009 | Murdock |
| 2009/0313006 A1 | 12/2009 | Tang |
| 2009/0326912 A1* | 12/2009 | Ueffing .............................. 704/2 |
| 2009/0326913 A1 | 12/2009 | Simard et al. |
| 2010/0005086 A1 | 1/2010 | Wang et al. |
| 2010/0017293 A1 | 1/2010 | Lung et al. |
| 2010/0042398 A1 | 2/2010 | Marcu et al. |
| 2010/0138210 A1 | 6/2010 | Seo et al. |
| 2010/0138213 A1 | 6/2010 | Bicici et al. |
| 2010/0174524 A1 | 7/2010 | Koehn |
| 2011/0029300 A1 | 2/2011 | Marcu et al. |
| 2011/0066643 A1 | 3/2011 | Cooper et al. |
| 2011/0082683 A1 | 4/2011 | Soricut et al. |
| 2011/0082684 A1 | 4/2011 | Soricut et al. |
| 2011/0191410 A1 | 8/2011 | Refuah et al. |
| 2011/0225104 A1 | 9/2011 | Soricut et al. |
| 2012/0016657 A1 | 1/2012 | He et al. |
| 2012/0096019 A1 | 4/2012 | Manickam et al. |
| 2012/0116751 A1 | 5/2012 | Bernardini et al. |
| 2012/0136646 A1 | 5/2012 | Kraenzel et al. |
| 2012/0150529 A1 | 6/2012 | Kim et al. |
| 2012/0253783 A1 | 10/2012 | Castelli et al. |
| 2012/0265711 A1 | 10/2012 | Assche |
| 2012/0278302 A1 | 11/2012 | Choudhury et al. |
| 2012/0323554 A1 | 12/2012 | Hopkins et al. |
| 2013/0018650 A1 | 1/2013 | Moore et al. |
| 2013/0024184 A1 | 1/2013 | Vogel et al. |
| 2013/0103381 A1 | 4/2013 | Assche |
| 2013/0238310 A1 | 9/2013 | Viswanathan |
| 2013/0290339 A1 | 10/2013 | Luvogt et al. |
| 2014/0006003 A1 | 1/2014 | Soricut et al. |
| 2014/0019114 A1 | 1/2014 | Travieso et al. |
| 2014/0149102 A1 | 5/2014 | Marcu et al. |
| 2014/0188453 A1 | 7/2014 | Marcu et al. |
| 2015/0106076 A1 | 4/2015 | Hieber et al. |

FOREIGN PATENT DOCUMENTS

| | | |
|---|---|---|
| CA | 2480398 | 6/2011 |
| DE | 1488338 | 4/2010 |
| DE | 202005022113.9 | 2/2014 |
| EP | 0469884 | 2/1992 |
| EP | 0715265 | 6/1996 |
| EP | 0933712 A2 | 8/1999 |
| EP | 0933712 A3 | 1/2001 |
| EP | 1488338 | 9/2004 |
| EP | 1488338 | 4/2010 |
| ES | 1488338 | 4/2010 |
| FR | 1488338 | 4/2010 |
| GB | 1488338 | 4/2010 |
| HK | 1072987 | 2/2006 |
| HK | 1072987 | 9/2010 |
| JP | 07244666 | 9/1995 |
| JP | 10011447 | 1/1998 |
| JP | 11272672 | 10/1999 |
| JP | 2004501429 | 1/2004 |
| JP | 2004062726 | 2/2004 |
| JP | 2008101837 | 5/2008 |
| JP | 5452868 | 1/2014 |
| WO | 03083710 | 10/2003 |
| WO | WO03083709 | 10/2003 |
| WO | 2004042615 | 5/2004 |
| WO | 2007056563 | 5/2007 |

(56) References Cited

FOREIGN PATENT DOCUMENTS

| | | |
|---|---|---|
| WO | 2011041675 | 4/2011 |
| WO | 2011162947 | 12/2011 |

OTHER PUBLICATIONS

Niessen et al, "Statistical machine translation with scarce resources using morphosyntactic information", Jun. 2004, Computational Linguistics, vol. 30, issue 2, pp. 181-204.*

Ueffing et al "Using POS Information for Statistical Machine Translation into Morphologically Rich Languages", Apr. 12-17, 2003, In Proc. 10th Conference of the European Chapter of the Association for Computational Linguistics (EACL), pp. 347-354.*

Koehn, "Noun Phrase Translation", 2003, Ph.D. thesis, University of Southern California, pp. i-105.*

"Abney, Steven P. , ""Parsing by Chunks,"" 1991, Principle-Based Parsing: Computation and Psycholinguistics, vol. 44,pp. 257-279."

Agbago, A., et al., "True-casing for the Portage System," In Recent Advances in Natural Language Processing (Borovets, Bulgaria), Sep. 21-23, 2005, pp. 21-24.

Al-Onaizan et al., "Statistical Machine Translation," 1999, JHU Summer Tech Workshop, Final Report, pp. 1-42.

"Al-Onaizan et al., ""Translating with Scarce Resources,"" 2000, 17th National Conference of the American Associationfor Artificial Intelligence, Austin, TX, pp. 672-678."

Al-Onaizan, Y. and Knight K., "Machine Transliteration of Names in Arabic Text,"Proceedings of ACL Workshop on Computational Approaches to Semitic Languages. Philadelphia, 2002.

"Al-Onaizan, Y. and Knight, K., ""Named Entity Translation: Extended Abstract"", 2002, Proceedings of HLT-02, SanDiego, CA."

"Al-Onaizan, Y. and Knight, K., ""Translating Named Entities Using Monolingual and Bilingual Resources,"" 2002, Proc. of the 40th Annual Meeting of the ACL, pp. 400-408."

"Alshawi et al., ""Learning Dependency Translation Models as Collections of Finite-State Head Transducers,"" 2000, Computational Linguistics, vol. 26, pp. 45-60."

Alshawi, Hiyan, "Head Automata for Speech Translation", Proceedings of the ICSLP 96, 1996, Philadelphia, Pennslyvania.

Ambati, V., "Dependency Structure Trees in Syntax Based Machine Translation," Spring 2008 Report <http://www.cs.cmu.edu/~vamshi/publications/DependencyMT_report.pdf>, pp. 1-8.

"Arbabi et al., ""Algorithms for Arabic name transliteration,"" Mar. 1994, IBM Journal of Research and Development,vol. 38, Issue 2, pp. 183-194."

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.

Ballesteros, L. et al., "Phrasal Translation and Query Expansion Techniques for Cross-Language Information Retrieval," SIGIR 97, Philadelphia, PA, © 1997, pp. 84-91.

"Bangalore, S. and Rambow, O., ""Evaluation Metrics for Generation,"" 2000, Proc. of the 1st International NaturalLanguage Generation Conf., vol. 14, pp. 1-8."

"Bangalore, S. and Rambow, O., ""Using TAGs, a Tree Model, and a Language Model for Generation,"" May 2000,Workshop TAG+5, Paris."

"Bangalore, S. and Rambow, O., ""Corpus-Based Lexical Choice in Natural Language Generation,"" 2000, Proc. ofthe 38th Annual ACL, Hong Kong, pp. 464-471."

"Bangalore, S. and Rambow, O., ""Exploiting a Probabilistic Hierarchical Model for Generation,"" 2000, Proc. of 18thconf. on Computational Linguistics, vol. 1, pp. 42-48."

Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.

"Barnett et al., ""Knowledge and Natural Language Processing,"" Aug. 1990, Communications of the ACM, vol. 33,Issue 8, pp. 50-71."

"Baum, Leonard, ""An Inequality and Associated Maximization Technique in Statistical Estimation for ProbabilisticFunctions of Markov Processes"""", 1972, Inequalities 3:1-8."

Berhe, G. et al., "Modeling Service-based Multimedia Content Adaptation in Pervasive Computing," CF '04 (Ischia, Italy) Apr. 14-16, 2004, pp. 60-69.

Boitet, C. et al., "Main Research Issues in Building Web Services for Mutualized, Non-Commercial Translation," Proc. of the 6th Symposium on Natural Language Processing, Human and Computer Processing of Language and Speech, © 2005, pp. 1-11.

"Brants, Thorsten, ""TnT—A Statistical Part-of-Speech Tagger,"" 2000, Proc. of the 6th Applied Natural LanguageProcessing Conference, Seattle."

Brill, Eric, "Transformation-Based Error-Driven Learning and Natural Language Processing: A Case Study in Part of Speech Tagging", 1995, Assocation for Computational Linguistics, vol. 21, No. 4, pp. 1-37.

"Brill, Eric. ""Transformation-Based Error-Driven Learning and Natural Language Processing: A Case Study in Partof Speech Tagging"",1995, Computational Linguistics, vol. 21, No. 4, pp. 543-565."

"Brown et al., ""A Statistical Approach to Machine Translation,"" Jun. 1990, Computational Linguistics, vol. 16, No. 2, pp. 79-85."

Brown et al., "Word-Sense Disambiguation Using Statistical Methods," 1991, Proc. of 29th Annual ACL, pp. 264-270.

"Brown et al., ""The Mathematics of Statistical Machine Translation: Parameter Estimation,"" 1993, ComputationalLinguistics, vol. 19, Issue 2, pp. 263-311."

"Brown, Ralf, ""Automated Dictionary Extraction for ""Knowledge-Free"" Example-Based Translation,""1997, Proc. of 7th Int'l Cont. on Theoretical and Methodological Issues in MT, Santa Fe, NM, pp. 111-118."

"Callan et al., ""TREC and TIPSTER 'Experiments with Inquery,"" 1994, Information Processing and Management,vol. 31, Issue 3, pp. 327-343."

Callison-Burch, C. et al., "Statistical Machine Translation with Word-and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.

"Carl, Michael. ""A Constructivist Approach to Machine Translation,"" 1998, New Methods of Language Processingand Computational Natural Language Learning, pp. 247-256."

"Chen, K. and Chen, H., ""Machine Translation: An Integrated Approach,"" 1995, Proc. of 6th Int'l Cont. on Theoreticaland Methodological Issue in MT, pp. 287-294."

Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.

Cheung et al., "Sentence Alignment in Parallel, Comparable, and Quasi-comparable Corpora", In Proceedings of LREC, 2004, pp. 30-33.

Chinchor, Nancy, "MUC-7 Named Entity Task Definition," 1997, Version 3.5.

"Clarkson, P. and Rosenfeld, R., ""Statistical Language Modeling Using the CMU-Cambridge Toolkit"", 1997, Proc. ESCA Eurospeech, Rhodes, Greece, pp. 2707-2710."

Cohen et al., "Spectral Bloom Filters," SIGMOD 2003, Jun. 9-12, 2003, ACM pp. 241-252.

Cohen, "Hardware-Assisted Algorithm for Full-text Large-Dictionary String Matching Using n-gram Hashing," 1998, Information Processing and Management, vol. 34, No. 4, pp. 443-464.

Cohen, Yossi, "Interpreter for FUF," (available at ftp:/ilftp.cs.bgu.ac.il/ pUb/people/elhadad/fuf-life.lf) (downloaded Jun. 1, 2008).

"Corston-Oliver, Simon, ""Beyond String Matching and Cue Phrases: Improving Efficiency and Coverage inDiscourse Analysis"""", 1998, The AAAI Spring Symposium on Intelligent Text Summarization, pp. 9-15."

(56) References Cited

OTHER PUBLICATIONS

Covington, "An Algorithm to Align Words for Historical Comparison", Computational Linguistics, 1996,vol. 22, No. 4, pp. 481-496.
"Dagan, I. and Itai, A., ""Word Sense Disambiguation Using a Second Language Monolingual Corpus""", 1994, Association forComputational Linguistics, vol. 20, No. 4, pp. 563-596."
"Dempster et al., ""Maximum Likelihood from Incomplete Data via the EM Algorithm""", 1977, Journal of the RoyalStatistical Society, vol. 39, No. 1, pp. 1-38."
"Diab, M. and Finch, S., ""A Statistical Word-Level Translation Model for Comparable Corpora,""" 2000, In Proc.of theConference on Content Based Multimedia Information Access (RIAO)."
"Diab, Mona, ""An Unsupervised Method for Multilingual Word Sense Tagging Using Parallel Corpora: APreliminary Investigation""", 2000, SIGLEX Workshop on Word Senses and Multi-Linguality, pp. 1-9."
Eisner, Jason, "Learning Non-Isomorphic Tree Mappings for Machine Translation," 2003, in Proc. of the 41st Meeting of the ACL, pp. 205-208.
Elhadad et al., "Floating Constraints in Lexical Choice", 1996, ACL, vol. 23 No. 2, pp. 195-239.
"Elhadad, M. and Robin, J., ""An Overview of SURGE: a Reusable Comprehensive Syntactic RealizationComponent,""" 1996, Technical Report 96-03, Department of Mathematics and Computer Science, Ben GurionUniversity, Beer Sheva, Israel."
Elhadad, M. and Robin, J., "Controlling Content Realization with Functional Unification Grammars", 1992, Aspects of Automated Natural Language Generation, Dale et al. (eds)., Springer Verlag, pp. 89-104.
"Elhadad, Michael, ""FUF: the Universal Unifier User Manual Version 5.2""", 1993, Department of Computer Science,Ben Gurion University, Beer Sheva, Israel."
"Elhadad, Michael, ""Using Argumentation to Control Lexical Choice: A Functional Unification Implementation""",1992, Ph.D. Thesis, Graduate School of Arts and Sciences, Columbia University."
"Elhadad, M. and Robin, J., ""Surge: a Comprehensive Plug-in Syntactic Realization Component for TextGeneration""", 1999 (available at http://www.cs.bgu.ac.il/-elhadad/pub.html),"
Fleming, Michael et al., "Mixed-Initiative Translation of Web Pages," AMTA 2000, LNAI 1934, Springer-Verlag, Berlin, Germany, 2000, pp. 25-29.
Och, Franz Josef and Ney, Hermann, "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> retrieved on May 6, 2004! abstract.
Ren, Fuji and Shi, Hongchi, "Parallel Machine Translation: Principles and Practice," Engineering of Complex Computer Systems, 2001 Proceedings, Seventh IEEE Int'l Conference, pp. 249-259, 2001.
Fung et al, "Mining Very-Non-Parallel Corpora: Parallel Sentence and Lexicon Extraction via Bootstrapping and EM", In EMNLP 2004.
"Fung, P. and Yee, L., ""An IR Approach for Translating New Words from Nonparallel, Comparable Texts""", 1998,36th Annual Meeting of the ACL, 17th International Conference on Computational Linguistics, pp. 414-420."
"Fung, Pascale, ""Compiling Bilingual Lexicon Entries From a Non-Parallel English-Chinese Corpus""", 1995, Proc, ofthe Third Workshop on Very Large Corpora, Boston, MA, pp. 173-183."
"Gale, W. and Church, K., ""A Program for Aligning Sentences in Bilingual Corpora,""" 1991, 29th Annual Meeting ofthe ACL, pp. 177-183."
Gale, W. and Church, K., "A Program for Aligning Sentences in Bilingual Corpora," 1993, Computational Linguisitcs, vol. 19, No. 1, pp. 177-184.
Galley et al., "Scalable Inference and Training of Context-Rich Syntactic Translation Models," Jul. 2006, in Proc. of the 21st International Conference on Computational Linguistics, pp. 961-968.
Galley et al., "What's in a translation rule?", 2004, in Proc. of HLT/NAACL '04, pp. 1-8.
Gaussier et al, "A Geometric View on Bilingual Lexicon Extraction from Comparable Corpora", In Proceedings of ACL 2004, July.
"Germann et al., ""Fast Decoding and Optimal Decoding for MachineTranslation""", 2001, Proc. of the 39thAnnualMeeting of the ACL, Toulouse, France, pp. 228-235."
"Germann, Ulrich: ""Building a Statistical Machine Translation System from Scratch: How Much Bang for theBuck Can We Expect?""" Proc. of the Data-Driven MT Workshop of ACL-01, Toulouse, France, 2001."
Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.
"Grefenstette, Gregory, ""The World Wide Web as a Resource for Example-Based Machine TranslationTasks""", 1999, Translating and the Computer 21, Proc. of the 21 st International Cant. on Translating and theComputer. London, UK, 12 pp."
Grossi et al, "Suffix Trees and Their Applications in String Algorithms", In. Proceedings of the 1st South American Workshop on String Processing, Sep. 1993, pp. 57-76.
Gupta et al., "Kelips: Building an Efficient and Stable P2P DHT thorough Increased Memory and Background Overhead," 2003 IPTPS, LNCS 2735, pp. 160-169.
Habash, Nizar, "The Use of a Structural N-gram Language Model in Generation-Heavy Hybrid Machine Translation," University of Maryland, Univ. Institute for Advance Computer Studies, Sep. 8, 2004.
"Hatzivassiloglou, V. et al., ""Unification-Based Glossing""", 1995, Proc. of the International Joint Conference onArtificial Intelligence, pp. 1382-1389."
Huang et al., "Relabeling Syntax Trees to Improve Syntax-Based Machine Translation Quality," Jun. 4-9, 2006, in Proc. of the Human Language Techology Conference of the North Americna Chapter of the ACL, pp. 240-247.
Ide, N. and Veronis, J., "Introduction to the Special Issue on Word Sense Disambiguation: The State of the Art", Mar. 1998, Computational Linguistics, vol. 24, Issue 1, pp. 2-40.
Bikel, D., Schwartz, R., and Weischedei, R., "An Algorithm that Learns What's in a Name," Machine Learning 34, 211-231 (1999).
Imamura et al., "Feedback Cleaning of Machine Translation Rules Using Automatic Evaluation," 2003 Computational Linguistics, pp. 447-454.
Imamura, Kenji, "Hierarchical Phrase Alignment Harmonized with Parsing", 2001, in Proc. of NLPRS, Tokyo.
"Jelinek, F., ""Fast Sequential Decoding Algorithm Using a Stack""", Nov. 1969, IBM J. Res. Develop., vol. 13, No. 6, pp. 675-685."
"Jones, K. Sparck, ""Experiments in Relevance Weighting of Search Terms""", 1979, Information Processing &Management, vol. 15, Pergamon Press Ltd., UK, pp. 133-144."
Klein et al., "Accurate Unlexicalized Parsing," Jul. 2003, in Proc. of the 41st Annual Meeting of the ACL, pp. 423-430.
"Knight et al., ""Integrating Knowledge Bases and Statistics in MT,""" 1994, Proc. of the Conference of the Associationfor Machine Translation in the Americas."
"Knight et al., ""Filling Knowledge Gaps in a Broad-Coverage Machine Translation System""", 1995, Proc. ofthe14th International Joint Conference on Artificial Intelligence, Montreal, Canada, vol. 2, pp. 1390-1396."
"Knight, K. and Al-Onaizan, Y., ""A Primer on Finite-State Software for Natural Language Processing""", 1999 (available at http://www.isLedullicensed-sw/carmel)."
Knight, K. and Al-Onaizan, Y., "Translation with Finite-State Devices," Proceedings of the 4th AMTA Conference, 1998.
"Knight, K. and Chander, I., ""Automated Postediting of Documents,"""1994, Proc. of the 12th Conference on ArtificialIntelligence, pp. 779-784."
Knight, K. and Graehl, J., "Machine Transliteration", 1997, Proc. of the ACL-97, Madrid, Spain, pp. 128-135.

(56) References Cited

OTHER PUBLICATIONS

"Knight, K. and Hatzivassiloglou, V., ""Two-Level, Many-Paths Generation,"" 1995, Proc. of the 33rd AnnualConference of the ACL, pp. 252-260."
"Knight, K. and Luk, S., ""Building a Large-Scale Knowledge Base for Machine Translation,"" 1994, Proc. of the 12thConference on Artificial Intelligence, pp. 773-778."
"Knight, K. and Marcu, D., ""Statistics-Based Summarization—Step One: Sentence Compression,"" 2000, AmericanAssociation for Artificial Intelligence Conference, pp. 703-710."
"Knight, K. and Yamada, K., ""A Computational Approach to Deciphering Unknown Scripts,"" 1999, Proc. of the ACLWorkshop on Unsupervised Learning in Natural Language Processing."
"Knight, Kevin, ""A Statistical MT Tutorial Workbook,"" 1999, JHU Summer Workshop (available at http://www.isI.edu/natural-language/mUwkbk.rtf)."
Knight, Kevin, "Automating Knowledge Acquisition for Machine Translation," 1997, AI Magazine, vol. 18, No. 4.
"Knight, Kevin, ""Connectionist Ideas and Algorithms,"" Nov. 1990, Communications of the ACM, vol. 33, No. 11, pp. 59-74."
"Knight, Kevin, ""Decoding Complexity in Word-Replacement Translation Models"", 1999, Computational Linguistics, vol. 25, No. 4."
"Knight, Kevin, ""Integrating Knowledge Acquisition and Language Acquisition"", May 1992, Journal of AppliedIntelligence, vol. 1, No. 4."
"Knight, Kevin, ""Learning Word Meanings by Instruction,-1996, Proc. of the D National Conference on ArtificialIntelligence, vol. 1, pp. 447-454."
Knight, Kevin, "Unification: A Multidisciplinary Survey," 1989, ACM Computing Surveys, vol. 21, No. 1.
Koehn, Philipp, "Noun Phrase Translation," A PhD Dissertation for the University of Southern California, pp. xiii, 23, 25-57, 72-81, Dec. 2003.
"Koehn, P. and Knight, K., ""ChunkMT: Statistical Machine Translation with Richer Linguistic Knowledge,"" Apr. 2002,Information Sciences Institution."
"Koehn, P. and Knight, K., ""Estimating Word Translation Probabilities from Unrelated Monolingual Corpora Usingthe EM Algorithm,"" 2000, Proc. of the 17th meeting of the AAAI."
Frederking et al., "Three Heads are Better Than One," In Proceedings of the 4th Conference on Applied Natural Language Processing, Stuttgart, Germany, 1994, pp. 95-100.
Och et al., "Discriminative Training and Maximum Entropy Models for Statistical Machine Translation," In Proc. of the 40th Annual Meeting of the Association for Computational Linguistics (ACL), Philadelphia, PA, 2002.
Yasuda et al., "Automatic Machine Translation Selection Scheme to Output the Best Result," Proc of LREC, 2002, pp. 525-528.
Huang et al. Automatic Extraction of Named Entity Translingual Equivalence Based on Multi-Feature Cost Minimization. In Proceedings of the ACL 2003 Workshop on Multilingual and Mixed-Language Name Entry Recognition.
Papineni et al., "Bleu: A Method for Automatic Evaluation of Machine Translation", Proc. of the 40th Annual Meeting of the Association for Computational Linguistics (ACL), Jul. 2002, pp. 311-318.
Shaalan et al., "Machine Translation of English Noun Phrases into Arabic", (2004), vol. 17, No. 2, International Journal of Computer Processing of Oriental Languages, 14 pages.
Isahara et al., "Analysis, Generation and Semantic Representation in CONTRAST—A Context-Based Machine Translation System", 1995, Systems and Computers in Japan, vol. 26, No. 14, pp. 37-53.
Proz.com, Rates for proofreading versus Translating, http://www.proz.comfforum/business_issues/202-rates_for_proofreading_versus_translating.html, Apr. 23, 2009, retrieved Jul. 13, 2012.
Celine, Volume discounts on large translation project, naked translations, http://www.nakedtranslations.com/en/2007/volume-discounts-on-large-translation-projects/, Aug. 1, 2007, retrieved Jul. 16, 2012.

Graehl, J and Knight, K, May 2004, Training Tree Transducers, In NAACL-HLT (2004), pp. 105-112.
Liu et al., "Context Discovery Using Attenuated Bloom Filters in Ad-Hoc Networks," Springer, pp. 13-25, 2006.
First Office Action mailed Jun. 7, 2004 in Canadian Patent Application 2408819, filed May 11, 2001.
First Office Action mailed Jun. 14, 2007 in Canadian Patent Application 2475857, filed Mar. 11, 2003.
Office Action mailed Mar. 26, 2012 in German Patent Application 10392450.7, filed Mar. 28, 2003.
First Office Action mailed Nov. 5, 2008 in Canadian Patent Application 2408398, filed Mar. 27, 2003.
Second Office Action mailed Sep. 25, 2009 in Canadian Patent Application 2408398, filed Mar. 27, 2003.
First Office Action mailed Jan. 3, 2005 in European Patent Application No. 03716920.8, filed Mar. 27, 2003.
Second Office Action mailed Nov. 9, 2006 in European Patent Application No. 03716920.8, filed Mar. 27, 2003.
Third Office Action mailed Apr. 30, 2008 in European Patent Application No. 03716920.8, filed Mar. 27, 2003.
Office Action mailed Oct. 25, 2011 in Japanese Patent Application 2007-536911 filed Oct. 12, 2005.
Office Action mailed Jul. 24, 2012 in Japanese Patent Application 2007-536911 filed Oct. 12, 2005.
Final Office Action mailed Apr. 1, 2013 in Japanese Patent Application 2007-536911 filed Oct. 12, 2005.
Office Action mailed May 13, 2005 in Chinese Patent Application 1812317.1, filed May 11, 2001.
Office Action mailed Apr. 21, 2006 in Chinese Patent Application 1812317.1, filed May 11, 2001.
Office Action mailed Jul. 19, 2006 in Japanese Patent Application 2003-577155, filed Mar. 11, 2003.
Office Action mailed 2007 in Chinese Patent Application 3805749.2, filed Mar. 11, 2003.
Office Action mailed Feb. 27, 2007 in Japanese Patent Application 2002-590018, filed May 13, 2002.
Office Action mailed Jan. 26, 2007 in Chinese Patent Application 3807018.9, filed Mar. 27, 2003.
Office Action mailed Dec. 7, 2005 in Indian Patent Application 2283/DELNP/2004, filed Mar. 11, 2003.
Office Action mailed Mar. 31, 2009 in European Patent Application 3714080.3, filed Mar. 11, 2003.
Agichtein et al., "Snowball: Extracting Information from Large Plain-Text Collections," ACM DL '00, the Fifth ACM Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action mailed Aug. 29, 2006 in Japanese Patent Application 2003-581064, filed Mar. 27, 2003.
Office Action mailed Jan. 26, 2007 in Chinese Patent Application 3807027.8, filed Mar. 28, 2003.
Office Action mailed Jul. 25, 2006 in Japanese Patent Application 2003-581063, filed Mar. 28, 2003.
Huang et al., "A syntax-directed translator with extended domain of locality," Jun. 9, 2006, In Proceedings of the Workshop on Computationally Hard Problems and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.
Huang et al., "Statistical syntax-directed translation with extended domain of locality," Jun. 9, 2006, In Proceedings of AMTA, pp. 1-8.
Notice of Allowance mailed Dec. 10, 2013 in Japanese Patent Application 2007-536911, filed Oct. 12, 2005.
Makoushina, J. "Translation Quality Assurance Tools: Current State and Future Approaches." Translating and the Computer, Dec. 17,

(56) References Cited

OTHER PUBLICATIONS 2007, 29, 1-39, retrieved at <http://www.palex.ru/fc/98/Translation%20Quality%20Assurance%20Tools.pdf>.
Specia et al. "Improving the Confidence of Machine Translation Quality Estimates," MT Summit XII, Ottawa, Canada, 2009, 8 pages.
Soricut et al., "TrustRank: Inducing Trust in Automatic Translations via Ranking", published in Proceedings of the 48th Annual Meeting of the Association for Computational Linguistics (Jul. 2010), pp. 612-621.
U.S. non-provisional patent U.S. Appl. No. 11/454,212, filed Jun. 15, 2006.
Editorial Free Lancer Association, Guidelines for Fees, https://web.archive.org/web/20090604130631/http://www.the-efa.org/res/code_2.php, Jun. 4, 2009, retrieved Aug. 9, 2014.
Lynn Wasnak, "Beyond the Basics How Much should I Charge", https://web.archive.org/web/20070121231531/http://www.writersmarket.com/assets/pdf/How_Much_Should_I_Charge.pdf, Jan. 21, 2007, retrieved Aug. 19, 2014.
Summons to Attend Oral Proceedings mailed Sep. 18, 2014 in German Patent Application 10392450.7, filed Mar. 28, 2003.
Examination Report mailed Jul. 22, 2013 in German Patent Application 112005002534.9, filed Oct. 12, 2005.
Leusch et al.., "A Novel String-to-String Distance Measure with Applications to Machine Translation Evaluation", 2003, https://www-i6.informatik.rwth-aachen.de, pp. 1-8.
Oflazer, Kemal., "Error-tolerant Finite-state Recognition with Application to Morphological Analysis and Spelling Correction", 1996, https://www.ucrel.lancs.ac.uk, pp. 1-18.
Snover et al., "A Study of Translation Edit Rate with Targeted Human Annotation", 2006, https://www.cs.umd.edu/~snover/pub/amta06/ter_amta.pdf, pp. 1-9.
Levenshtein, V.I., "Binary Codes Capable of Correcting Deletions, Insertions, and Reversals", 1966, Doklady Akademii Nauk SSSR, vol. 163, No. 4, pp. 707-710.
Office Action mailed Feb. 2, 2015 in German Patent Application 10392450.7, filed Mar. 28, 2003.
Abney, Steven P., "Parsing by Chunks," 1994, Bell Communications Research, pp. 1-18.
"Rapp, Reinhard, ""Identifying Word Translations in Non-Parallel Texts,"" 1995, 33rd Annual Meeting of the ACL, pp. 320-322."
Rayner et al., "Hybrid Language Processing in the Spoken Language Translator," IEEE, pp. 107-110. Apr 1997.
"Resnik, P. and Smith, A., ""The Web as a Parallel Corpus,"" Sep. 2003, Computational Linguistics, SpecialIssue on Web as Corpus, vol. 29, Issue 3, pp. 349-380."
"Resnik, P. and Yarowsky, D. ""A Perspective on Word Sense Disambiguation Methods and Their Evaluation,"" 1997, Proceedings of SIGLEX '97, Washington, D.C., pp. 79-86."
"Resnik, Philip, ""Mining the Web for Bilingual Text,"" 1999, 37th Annual Meeting of the ACL, College Park, MD, pp. 527-534."
Rich, E. and Knight, K., "Artificial Intelligence, Second Edition," 1991, McGraw-Hili Book Company [redacted].
"Richard et al., ""Visiting the Traveling Salesman Problem with Petri nets and application in the glass industry,"" Feb. 1996, IEEE Emerging Technologies and Factory Automation, pp. 238-242."
"Robin, Jacques, ""Revision-Based Generation of Natural Language Summaries Providing Historical Background: Corpus-Based Analysis, Design Implementation and Evaluation,"" 1994, Ph.D. Thesis, Columbia University, New York."
Rogati et al., "Resource Selection for Domain-Specific Cross-Lingual IR," ACM 2004, pp. 154-161.
Zhang, R. et al., "The NiCT-ATR Statistical Machine Translation System for the IWLST 2006 Evaluation," submitted to IWSLT, 2006.
"Russell, S. and Norvig, P., ""Artificial Intelligence: A Modern Approach,"" 1995, Prentice-Hall, Inc., New Jersey [redacted—table of contents]."
"Sang, E. and Buchholz, S., ""Introduction to the CoNLL-2000 Shared Task: Chunking,"" 2002, Proc. ofCoNLL-2000 and LLL-2000, Lisbon, Portugal, pp. 127-132."

Schmid, H., and Schulte im Walde, S., "Robust German Noun Chunking With a Probabilistic Context-Free Grammar," 2000, Proc. of the 18th Conference on Computational Linguistics, vol. 2, pp. 726-732.
"Schutze, Hinrich, ""Automatic Word Sense Discrimination,"" 1998, Computational Linguistics, Special Issue on WordSense Disambiguation, vol. 24, Issue 1, pp. 97-123."
"Selman et al., ""A New Method for Solving Hard Satisfiability Problems,"" 1992, Proc. of the 10th National Conferenceon Artificial Intelligence, San Jose, CA, pp. 440-446."
Kumar, S. and Byrne, W., "Minimum Bayes-Risk Decoding for Statistical Machine Translation." HLTNACCL Conference. Mar. 2004, 8 pages.
"Shapiro, Stuart (ed.), ""Encyclopedia of Artificial Intelligence, 2nd edition—, vol.D 2,1992, John Wiley & Sons Inc;" Unification" article, K. Knight, pp. 1630-1637."
Shirai, S., "A Hybrid Rule and Example-based Method for Machine Translation," NTT Communication Science Laboratories, pp. 1-5, Dec. 1997.
"Sobashima et al., ""A Bidirectional Transfer-Driven Machine Translation System for Spoken Dialogues,"" 1994, Proc. of 15th Conference on Computational Linguistics, vol. 1, pp. 64-68."
"Soricut et al., ""Using a Large Monolingual Corpus to Improve Translation Accuracy,"" 2002, Lecture Notes in Computer Science, vol. 2499, Proc. of the 5th Conference of the Association for Machine Translation in theAmericas on Machine Translation: From Research to Real Users, pp. 155-164."
"Stalls, B. and Knight, K., ""Translating Names and Technical Terms in Arabic Text,"" 1998, Proc. of the COLING/ACL Workkshop on Computational Approaches to Semitic Language."
"Sumita et al., ""A Discourse Structure Analyzer for Japanese Text,"" 1992, Proc. of the International Conference onFifth Generation Computer Systems, vol. 2, pp. 1133-1140."
"Sun et al., ""Chinese Named Entity Identification Using Class-based Language Model,"" 2002, Proc. of 19th International Conference on Computational Linguistics, Taipei, Taiwan, vol. 1, pp. 1-7."
Tanaka, K. and Iwasaki, H. "Extraction of Lexical Translations from Non-Aligned Corpora," Proceedings of COLING 1996.
Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.
"Taylor et al., ""The Penn Treebank: An Overview,"" In A. Abeill (ed.), D Treebanks: Building and Using ParsedCorpora, 2003, pp. 5-22."
"Tiedemann, Jorg, ""Automatic Construction of Weighted String Similarity Measures,"" 1999, In Proceedings ofthe Joint SIGDAT Conference on Emperical Methods in Natural Language Processing and Very Large Corpora."
"Tillman, C. and Xia, F., ""A Phrase-Based Unigram Model for Statistical Machine Translation,"" 2003, Proc. of theNorth American Chapter of the ACL on Human Language Technology, vol. 2, pp. 106-108."
"Tillmann et al., ""A DP Based Search Using Monotone Alignments in Statistical Translation,"" 1997, Proc. of theAnnual Meeting of the ACL, pp. 366-372."
Tomas, J., "Binary Feature Classification for Word Disambiguation in Statistical Machine Translation," Proceedings of the 2nd Int'l. Workshop on Pattern Recognition, 2002, pp. 1-12.
Uchimoto, K. et al., "Word Translation by Combining Example-Based Methods and Machine Learning Models," Natural LanguageProcessing (Shizen Gengo Shori), vol. 10, No. 3, Apr. 2003, pp. 87-114.
Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation).
"Ueffing et al., ""Generation of Word Graphs in Statistical Machine Translation,"" 2002, Proc. of Empirical Methods inNatural Language Processing (EMNLP), pp. 156-163."

(56) References Cited

OTHER PUBLICATIONS

Varga et al., "Parallel Corpora for Medium Density Languages", In Proceedings of RANLP 2005, pp. 590-596.
"Veale, T. and Way, A., ""Gaijin: A Bootstrapping, Template-Driven Approach to Example-Based MT,"" 1997, Proc. ofNew Methods in Natural Language Processing (NEMPLP97), Sofia, Bulgaria."
Vogel et al., "The CMU Statistical Machine Translation System," 2003, Machine Translation Summit IX, New Orleans, LA.
"Vogel et al., ""The Statistical Translation Module in the Verbmobil System,"" 2000, Workshop on Multi-Lingual SpeechCommunication, pp. 69-74."
"Vogel, S. and Ney, H., ""Construction of a Hierarchical Translation Memory,"" 2000, Proc. of Cooling 2000, Saarbrucken, Germany, pp. 1131-1135."
"Wang, Y. and Waibel, A., ""Decoding Algorithm in Statistical MachineTranslation,"" 1996, Proc. of the 35th AnnualMeeting of the ACL, pp. 366-372."
"Wang, Ye-Yi, ""Grammar Inference and Statistical Machine Translation,"" 1998, Ph.D Thesis, Carnegie MellonUniversity, Pittsburgh, PA."
"Watanabe et al., ""Statistical Machine Translation Based on Hierarchical Phrase Alignment,"" 2002, 9th InternationalConference on Theoretical and Methodological Issues in Machin Translation (TMI-2002), Keihanna, Japan, pp. 188-198."
"Witbrock, M. and Mittal, V., ""Ultra-Summarization: A Statistical Approach to Generating Highly Condensed Non-Extractive Summaries,"" 1999, Proc. of SIGIR '99, 22nd International Conference on Research and Development inInformation Retrieval, Berkeley, CA, pp. 315-316."
"Wu, Dekai, ""A Polynomial-Time Algorithm for Statistical Machine Translation,"" 1996, Proc. of 34th Annual Meeting ofthe ACL, pp. 152-158."
"Wu, Dekai, ""Stochastic Inversion Transduction Grammars and Bilingual Parsing of Parallel Corpora,"" 1997, Computational Linguistics, vol. 23, Issue 3, pp. 377-403."
"Yamada, K. and Knight, K. ""A Syntax-Based Statistical Translation Model,"" 2001, Proc. of the 39th AnnualMeeting of the ACL, pp. 523-530."
"Yamada, K. and Knight, K., ""A Decoder for Syntax-Based Statistical MT,"" 2001, Proceedings of the 40th AnnualMeeting of the ACL, pp. 303-310."
Yamada K., "A Syntax-Based Statistical Translation Model," 2002 PhD Dissertation, pp. 1-141.
"Yamamoto et al., ""A Comparative Study on Translation Units for Bilingual Lexicon Extraction,"" 2001, JapanAcademic Association for Copyright Clearance, Tokyo, Japan."
Yamamoto et al, "Acquisition of Phrase-level Bilingual Correspondence using Dependency Structure" In Proceedings of COLING-2000, pp. 933-939.
"Yarowsky, David, ""Unsupervised Word Sense Disambiguation Rivaling Supervised Methods,"" 1995, 33rd AnnualMeeting of the ACL, pp. 189-196."
"Koehn, P. and Knight, K., ""Knowledge Sources for Word-Level Translation Models,"" 2001, Conference on EmpiricalMethods in Natural Language Processing."
"Kumar, R. and Li, H., ""Integer Programming Approach to Printed Circuit Board Assembly Time Optimization,"" 1995,IEEE Transactions on Components, Packaging, and Manufacturing, Part B: Advance Packaging, vol. 18,No. 4. pp. 720-727."
Kupiec, Julian, "An Algorithm for Finding Noun Phrase Correspondences in Bilingual Corpora," In Proceedings of the 31st Annual Meeting of the ACL, 1993, pp. 17-22.
"Kurohashi, S. and Nagao, M., ""Automatic Detection of Discourse Structure by Checking Surface Information inSentences,"" 1994, Proc. of COL-LING '94, vol. 2, pp. 1123-1127."
"Langkilde, I. and Knight, K., ""Generation that Exploits Corpus-Based Statistical Knowledge,"" 1998, Proc. of theCOLING-ACL, pp. 704-710."

"Langkilde, I. and Knight, K., ""The Practical Value of N-Grams in Generation,"" 1998, Proc. of the 9th InternationalNatural Language Generation Workshop, pp. 248-255."
"Langkilde, Irene, ""Forest-Based Statistical Sentence Generation,"" 2000, Proc. of the 1st Conference on NorthAmerican chapter of the ACL, Seattle, WA, pp. 170-177."
"Langkilde-Geary, Irene, ""A Foundation for General-Purpose Natural Language Generation: SentenceRealization Using Probabilistic Models of Language,"" 2002, Ph.D. Thesis, Faculty of the Graduate School, Universityof Southern California."
"Langkilde-Geary, Irene, ""An Empirical Verification of Coverage and Correctness for a General-PurposeSentence Generator,"" 1998, Proc. 2nd Int'l Natural Language Generation Conference."
"Lee-Y.S.,""Neural Network Approach to Adaptive Learning: with an Application to Chinese HomophoneDisambiguation,"" IEEE pp. 1521-1526", Jul. 2001.
Lita, L., et al., "tRuEcasIng," Proceedings of the 41st Annual Meeting of the Assoc. for Computational Linguistics (In Hinrichs, E. and Roth, D.-editors), pp. 152-159, Jul. 2003.
Llitjos, A. F. et al., "The Translation Correction Tool: English-Spanish User Studies," Citeseer © 2004, downloaded from: http://gs37.sp.cs.cmu.edu/ari/papers/Irec04/font11, pp. 1-4.
"Mann, G. and Yarowsky, D., ""Multipath Translation Lexicon Induction via Bridge Languages,"" 2001, Proc. of the2nd Conference of the North American Chapter of the ACL, Pittsburgh, PA, pp. 151-158."
"Manning, C. and Schutze, H., ""Foundations of Statistical Natural Language Processing,"" 2000, The MIT Press, Cambridge, MA [redacted]."
"Marcu, D. and Wong, W., ""A Phrase-Based, Joint Probability Model for Statistical Machine Translation,"" 2002, Proc.of ACL-2 conference on Empirical Methods in Natural Language Processing, vol. 10, pp. 133-139."
"Marcu, Daniel, ""Building up Rhetorical Structure Trees,"" 1996, Proc. of the National Conference on ArtificialIntelligence and Innovative Applications of Artificial Intelligence Conference, vol. 2, pp. 1069-1074."
"Marcu, Daniel, ""Discourse trees are good indicators of importance in text,"" 1999, Advances in Automatic TextSummarization, The MIT Press, Cambridge, MA."
"Marcu, Daniel, ""Instructions for Manually Annotating the Discourse Structures of Texts,"" 1999, DiscourseAnnotation, pp. 1-49."
"Marcu, Daniel, ""The Rhetorical Parsing of Natural Language Texts,"" 1997, Proceedings of ACLIEACL '97, pp. 96-103."
"Marcu, Daniel, ""The Rhetorical Parsing, Summarization, and Generation of Natural Language Texts,"" 1997, Ph. D.Thesis, Graduate Department of Computer Science, University of Toronto."
"Marcu, Daniel, ""Towards a Unified Approach to Memory- and Statistical-Based Machine Translation,"" 2001, Proc.of the 39th Annual Meeting of the ACL, pp. 378-385."
McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.
McDevitt, K. et al., "Designing of a Community-based Translation Center," Technical Report TR-03-30, Computer Science, Virginia Tech, © 2003, pp. 1-8.
"Melamed, I. Dan, ""A Word-to-Word Model of Translational Equivalence,"" 1997, Proc. of the 35th Annual Meeting ofthe ACL, Madrid, Spain, pp. 490-497."
"Melamed, I. Dan, ""Automatic Evaluation and Uniform Filter Cascades for Inducing N-Best Translation Lexicons,""1995, Proc. of the 3rd Workshop on Very Large Corpora, Boston, MA, pp. 184-198."
"Melamed, I. Dan, ""Empirical Methods for Exploiting Parallel Texts,"" 2001, MIT Press, Cambridge, MA [table ofcontents]."
"Meng et al.. ""Generating Phonetic Cognates to Handle Named Entities in English-Chinese Cross-LanguageSpoken Document Retrieval,"" 2001, IEEE Workshop on Automatic Speech Recognition and Understanding. pp. 311-314."

(56) References Cited

OTHER PUBLICATIONS

Metze, F. et al., "The NESPOLE! Speech-to-Speech Translation System," Proc. of the HLT 2002, 2nd Int'l Conf. on Human Language Technology (San Francisco, CA), © 2002, pp. 378-383.

"Mikheev et al., ""Named Entity Recognition without Gazeteers,"" 1999, Proc. of European Chapter of the ACL, Bergen,Norway, pp. 1-8."

"Miike et al., ""A Full-Text Retrieval System with a Dynamic Abstract Generation Function,"" 1994, Proceedings of SIGIR'94, pp. 152-161."

"Mohri, M. and Riley, M., ""An Efficient Algorithm for the N-Best-Strings Problem,"" 2002, Proc. of the 7th Int. Conf. onSpoken Language Processing (ICSLP'02), Denver, CO, pp. 1313-1316."

Mohri, Mehryar, "Regular Approximation of Context Free Grammars Through Transformation", 2000, pp. 251-261, "Robustness in Language and Speech Technology", Chapter 9, Kluwer Academic Publishers.

"Monasson et al., ""Determining Computational Complexity from Characteristic 'Phase Transitions',"" Jul. 1999, NatureMagazine, vol. 400, pp. 133-137."

"Mooney, Raymond, ""Comparative Experiments on Disambiguating Word Senses: An Illustration of the Role of Biasin Machine Learning,"" 1996, Proc. of the Conference on Empirical Methods in Natural Language Processing, pp. 82-91."

Nagao, K. et al., "Semantic Annotation and Transcoding: Making Web Content More Accessible," IEEE Multimedia, vol. 8, Issue Apr. 2-Jun. 2001, pp. 69-81.

"Nederhof, M. and Satta, G., ""IDL-Expressions: A Formalism for Representing and Parsing Finite Languages inNatural Language Processing,"" 2004, Journal of Artificial Intelligence Research, vol. 21, pp. 281-287."

"Niessen, S. and Ney, H, ""Toward Hierarchical Models for Statistical Machine Translation of Inflected Languages,"" 2001,Data-Driven Machine Translation Workshop, Toulouse, France, pp. 47-54."

Norvig, Peter, "Techniques for Automatic Memoization with Applications to Context-Free Parsing", Compuational Linguistics,1991, pp. 91-98, vol. 17, No. 1.

"Och et al., ""Improved Alignment Models for Statistical Machine Translation,"" 1999, Proc. of the Joint Conf. ofEmpirical Methods in Natural Language Processing and Very Large Corpora, pp. 20-28."

Och et al. "A Smorgasbord of Features for Statistical Machine Translation." HLTNACCL Conference. Mar. 2004, 8 pages.

Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096.

"Och, F. and Ney, H, ""Improved Statistical Alignment Models,"" 2000, 38th Annual Meeting of the ACL, Hong Kong, pp. 440-447."

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Och, F. and Ney, H., "A Systematic Comparison of Various Statistical Alignment Models," Computational Linguistics, 2003, 29:1, 19-51.

Papineni et al., ""Bleu: A Method for Automatic Evaluation of Machine Translation,"" 2001, IBM Research Report.

Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.

Petrov et al., "Learning Accurate, Compact and Interpretable Tree Annotation," Jun. 4-9, 2006, in Proc. of the Human Language Technology Conference of the North American Chapter of the ACL, pp. 433-440.

"PLA et al., ""Tagging and Chunking with Bigrams,"" 2000, Proc. of the 18th Conference on Computational Linguistics, vol. 2, pp. 614-620"

Qun, Liu, "A Chinese-English Machine Translation System Based on Micro-Engine Architecture," An Int'l. Conference on Translation and Information Technology, Hong Kong, Dec. 2000, pp. 1-10.

Rapp, Reinhard, Automatic Identification of Word Translations from Unrelated English and German Corpora, 1999, 37th Annual Meeting of the ACL, pp. 519-526.

Zhang et al., "Synchronous Binarization for Machine Translations," Jun. 4-9, 2006, In Proc. of the Human Language Technology Conference of the North American Chapter of the ACL, pp. 256-263.

Zhang et al., "Distributed Language Modeling for N-best List Reranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.

"Patent Cooperation Treaty International Preliminary Report on Patentability and The Written Opinion, Internationalapplication No. PCT/US2008/004296, Oct. 6, 2009, 5 pgs."

Document, Wikipedia.com, web.archive.org (Feb. 24, 2004) <http://web.archive.org/web/20040222202831 /http://en.wikipedia.org/wikiiDocument>, Feb. 24, 2004.

Identifying, Dictionary.com, wayback.archive.org (Feb. 28, 2007) <http://wayback.archive.org/web/200501 01 OOOOOO*/http:////dictionary.reference.com//browse//identifying>, Feb. 28, 2005 <http://web.archive.org/web/20070228150533/http://dictionary.reference.com/browse/identifying>.

Koehn, P. et al, "Statistical Phrase-Based Translation," Proceedings of HLT-NAACL 2003 Main Papers, pp. 48-54 Edmonton, May-Jun. 2003.

Abney, S.P., "Stochastic Attribute Value Grammars", Association for Compuational Linguistics, 1997, pp. 597-618.

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.

Tillman, C., et al, "Word Reordering and a Dynamic Programming Beam Search Algorithm for Statistical Machine Translation" <URL: http://acl.ldc.upenn.edu/J/J03/J03-1005.pdf> Mar. 1, 2003.

Wang, W., et al. "Capitalizing Machine Translation" In HLT-NAACL '06 Proceedings Jun. 2006. <http://www.isi.edu/natural-language/mt/hlt-naacl-06-wang.pdf>.

Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.

\* cited by examiner

USE OF ANNOTATIONS IN STATISTICAL MACHINE TRANSLATION

BACKGROUND

1. Field of the Invention

The present invention relates generally to statistical machine translation of documents and more specifically to systems and methods for processing annotations associated with a translation memory.

2. Description of the Related Art

In the field of computer-generated translations, there are two approaches to translating a document from a source language into a target language. The first approach is statistical machine translation (SMT) which uses a set of statistical probabilities to match a word or phrase in one language to an equivalent word or phrase in another language. The set of probabilities is generated using a large quantity of documents that have been previously translated from the source language to the target language.

The second approach is translation memory (TM) which uses bilingual databases of parallel translations of sentence segments. A segment of a source document in a source language is matched to an entry in the TM. The corresponding entry, in the target language, is provided as a translation of the segment. However, TM techniques are limited to translating only the segments that have a corresponding entry in the TM database. For example, a sentence in French such as "Solaris—mise a jour (11-22 UC) serveur NET: 3 licence de utilization" can not be translated using a database with a similar entry such as:

| | |
|---|---|
| Solaris - mise à jour (33-64 UC) serveur | Solaris - SPARC server (33-64 CPU) |
| SPARC: 1 licence de utilisation | upgrade: 1 RTU license |
| Voir page 122 pour le numéro de référence de la mise à niveau de garantie recommandée. | See page 122 for the recommended warranty upgrade part number. | because the database does not include an entry that matches the sentence exactly. To adapt the TM to identify tags that indicate occurrences such as words or values, the TM includes abstract tags in the entries. For example, the database above may be rewritten as:

| | |
|---|---|
| PRODUCTNAME - mise à jour (NUM-NUM COMPONENTNAME) serveur PRODUCTNAME: NUM licence de utilisation Voir page NUM pour le numéro de référence de la mise à niveau de garantie recommandée. | PRODUCTNAME - PRODUCTNAME server (NUM-NUM COMPONENTNAME) upgrade: NUM RTU licence See page NUM for the recommended warranty upgrade part number. | where the tags (in capital letters) appear in place of the words indicating words such as the product name, the component name, and numerals. The rewritten database includes a match for the sentence above and can provide a perfect translation.

However, if the modified TM is used to train an SMT engine, the tags can interfere with the training process and result in less accurate translation probabilities when the system receives segments to be translated that have not been rewritten via the same process used to modify the TM. This may result in inaccurate translations.

SUMMARY OF THE INVENTION

A method, system, and computer readable medium for translating a document is provided. A statistical machine translation engine is trained using a translation memory comprising an annotation. A translation rule associated with the annotation is defined. A source document in a source language is received. The source document comprises an instance of the annotation and a string. The string is translated using the statistical machine translation engine. The instance of the annotation is processed according to the translation rule. A target document in a target language is generated based on the translated string and the processed annotation.

DETAILED DESCRIPTION

A system and method for translating a document having annotations is provided. The system and method may be used to integrate translation memory (TM) systems and statistical machine translation (SMT) systems. The system and method distinguishes between annotations to translate according to rules associated with a configuration set and word strings to translate using statistical machine translation to generate a translated document. The system and method may also be used by the translation engine 104 when no TM is available.

Figure 1:
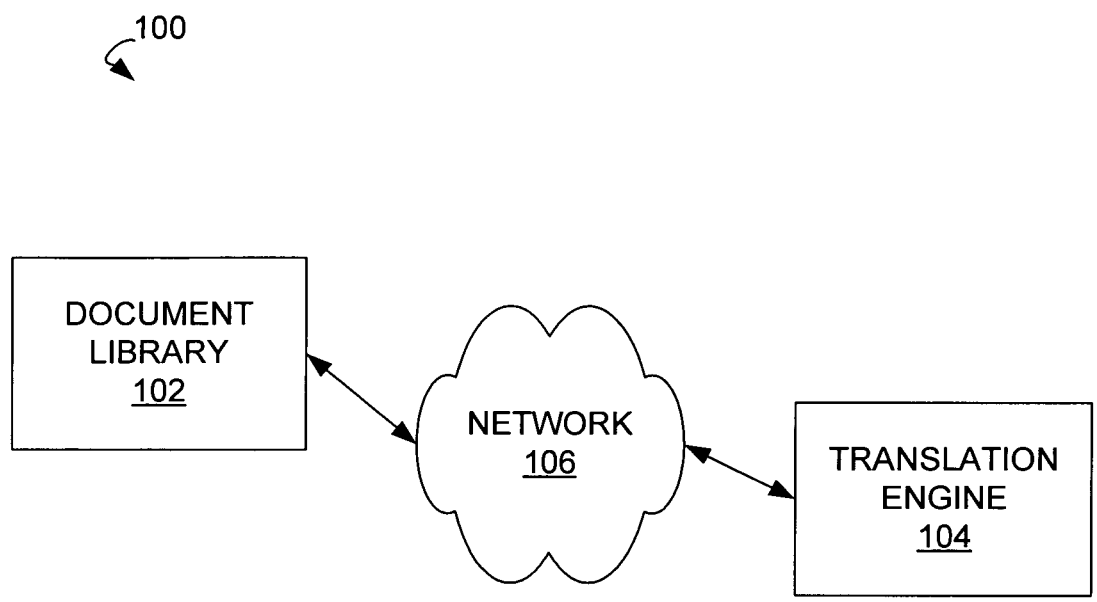
FIG. 1 depicts an illustration of an exemplary environment in which some embodiments may be practiced.

FIG. 1 depicts an illustration of an exemplary environment 100 in which some embodiments may be practiced. The environment 100 comprises a document library 102, a translation engine 104, and a network 106. The translation engine 104 is configured to communicate with the document library over the network 106. The network 106 may comprise a public network (e.g., the Internet) or a private network. The document library 102 comprises parallel translations of documents or segments of documents used in SMT. These parallel translations may be referred to as "parallel segments." The document library may also include a TM database. The translation memory database may include entries having abstract tags. The abstract tags may include annotations indicating a value, a component name, a product name, or other lingo.

The translation engine 104 is configured to translate a document written in a source language into a target language using statistical machine translation (SMT). The source language is the language in which the source document appears. The target language is the language into which the source document is translated. The generated translation of the document is the target document. The translation engine 104 may retrieve documents from the document library 102 that are to be translated. In some embodiments, the translation engine 104 is trained based on the parallel segments stored in the document library 102. The translation engine 104 may also be trained using the TM database.

In operation, the translation engine 104 accesses the parallel segments and TM database stored in the document library 102 to generate sets of statistical probabilities used to translate a source document. The generated sets of statistical probabilities may be stored in the document library 102 and/or the translation engine 104. If the TM database comprises entries containing abstract tags, the document library 102 and/or the translation engine 104 may comprise a configuration set that defines the abstract tags such that the translation engine 104 is able to recognize the abstract tags as such during training and/or document translation. More specifically, the configuration set is a set of configuration values that define the processing behavior of annotations in a source document.

Figure 2:
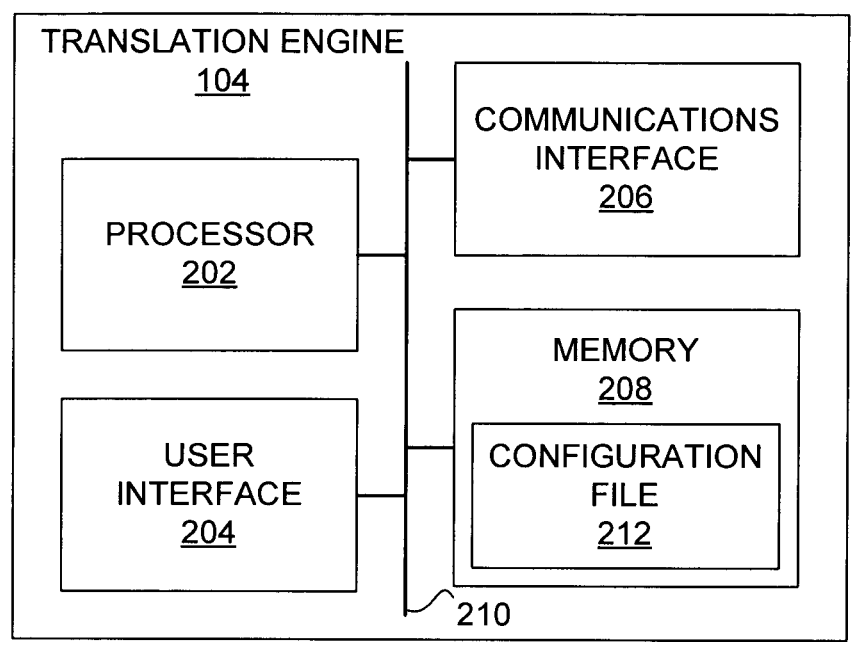
FIG. 2 depicts a block diagram illustrating an exemplary translation engine according to exemplary embodiments.

FIG. 2 depicts a block diagram illustrating a translation engine 104 according to exemplary embodiments. The translation engine 104 is configured to translate a source document into a target language to generate a target document. The translation engine 104 may comprise a computational device, such as a desktop computer, server, laptop computer, or the like. The translation engine 104 comprises a processor 202, a user interface 204, a communication interface 206, and a memory 208 that communicate via the bus 210. The processor 202 is configured to execute commands received via the communication interface 206 or the user interface 204. The commands may include an instruction to generate a set of statistical probabilities using a set of parallel segments, an instruction to identify annotations or abstract tags, and/or an instruction to translate a selected document. The processor 202 is further configured to retrieve and execute commands from the memory 208.

The user interface 204 is configured to display a graphical user interface (GUI) to a user and receive input from the user. The user interface 204 may comprise a monitor, speakers, a keyboard, a mouse, and so forth. The input received via the user interface 204 may include a selection of a document to be translated, an annotation definition, or corrections to the target document. The communication interface 206 is configured to receive and transmit data, such as source documents or target documents, over the network 106.

The memory 208 is configured to store instructions for translating a document using statistical machine translation. The memory 208 may further store a configuration set 212. The configuration set 212 defines annotations that occur in the TM database to indicate abstractions such as values, model numbers, and technical jargon. The configuration set 212 may further define one or more translating or formatting annotations associated with the TM database. The configuration set 212 is discussed further herein. Although translation engine 104 is illustrated as having the processor 202, the user interface 204, the communication interface 206, the memory 208, and the bus 210, fewer or more modules may comprise translation engine 104 and still fall within the scope of various embodiments.

The translation engine 104 is configured to integrate annotations appearing in a TM database into the SMT technique used by the translation engine 104. By integrating the annotations, a source document can be translated as a whole rather than broken into segments that are translated according to whether a match appears in the TM database.

To integrate the annotations, a user generates a configuration set that defines the annotations occurring in a TM database. For example, the annotation:

<NUM number="33"/> may appear in the TM database within an entry such as:

| Voir page <NUM number = "33"/> le numéro de référence de la mise à niveau de garantie recommandée. | See page <NUM number = "33"/> for the recommended warranty upgrade part number. |
| --- | --- |

The configuration set 212, to instruct the translation engine 104 as to the functionality of the annotation, may include a translation rule such as:

<tag tag-name="NUM" word-class="number" />

The configuration set 212, therefore, includes a translation rule for recognizing an annotation and distinguishing the annotation from other sentence fragments appearing in the source document.

By training the translation engine 104 to recognize the annotation "<NUM number="33"/>", the translation engine 104 can be further trained based on the entries in the TM database. Training the translation engine 104 using the parallel segments listed as entries in the TM database increases the accuracy of the set of statistical probabilities used in SMT. In the above example, the translation engine 104 is able to assign a higher probability that the French phrase, "Voir page <NUM number="33"/> pour" is translated "See page <NUM number="33"/> for." Further, because of the annotation, the translation engine 104 is able to accurately translate the French phrase, "Voir page <NUM number="56"/> pour" as "See page <NUM number="56"/> for" without further training or input from the user.

When a user selects a source document to be translated, the annotations are added to the source document. The translation engine 104 translates the source document using SMT. Additionally, the translation engine 104 processes annotations according to the configuration set 212. For example, some annotations, as described below, may include a translation rule that instructs the translation engine 104 to process segments of the source document differently. The annotations, therefore, give a user greater control over how a source document is translated.

Figure 3:
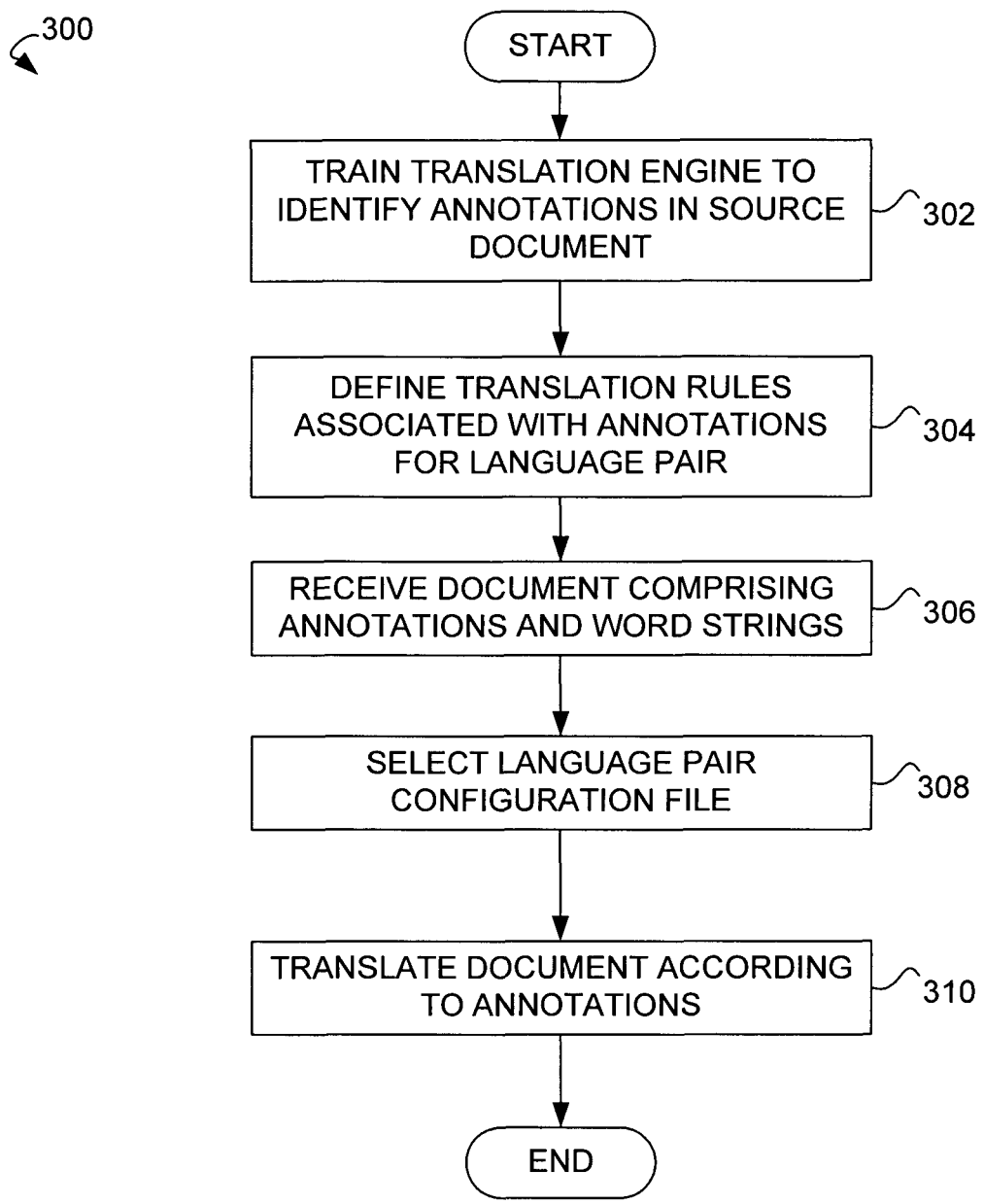
FIG. 3 depicts a flowchart illustrating an exemplary process for integrating a translation memory with a statistical machine translation engine according to exemplary embodiments.

FIG. 3 depicts a flowchart illustrating an exemplary process 300 for integrating a translation memory with a statistical machine translation (SMT) engine according to exemplary embodiments. The statistical machine translation engine may comprise the translation engine 104. The exemplary process 300 allows the translation engine 104 to accurately translate source documents that include the annotations. The annotations may indicate abstract values and/or terms. According to exemplary embodiments, the annotations may comprise extensible markup language (XML) tags, hypertext markup language (HTML), other markups based on standard generalized markup language (SGML), a textual field, or other annotation mechanism. The annotations are defined in the configuration set 212 and may appear in the TM database.

In step 302, the translation engine 104 is trained using the TM database to identify and process the annotations in the source document. Training the translation engine 104 using the TM database also allows the translation engine 104 to learn general translation patterns within the database entries and modify the probability values associated with words or fragments accordingly. For example, the translation engine 104 may learn an output context for the annotations. An output context is the word or words that consistently appear in the target document around selected annotations, such as a defined semantic behavior for dates, numbers, product names, or the like.

In step 304, translation rules associated with the annotations are defined for a language pair. The translation rules may include an output context, a translation boundary, and/or a formatting instruction. The translation rules may be probabilistic or heuristic.

For example, a word class annotation indicates that a word or phrase belongs to an abstract word class. For example, the annotation:

<NUM numb er="122"/>
indicates that the text "122" is a number, such as a page number. Likewise, the annotation:
 <VAL metric="2.59 N*m"/>
indicates that the text "2.59 N*m" is a metric measurement. The translation engine 104 may preserve the word class annotation in the target document. Other annotations may be used to indicate product names, component names, technical jargon, and so forth.

A translation boundary indicates that text occurring before the boundary is translated separately from text occurring after the boundary. By including a boundary, a user is able to prevent "translation swap" occurring across the boundary. For example, a user can indicate that text occurring between parentheses in a source document to be translated separately from the text occurring outside the parenthesis. For example, the annotation:
 <segment x="1"/>L=16<segment/>
indicates that the fragment "L=16" is to be translated independently of the text surrounding the fragment.

In some embodiments, a second boundary annotation comprises a sentence boundary. A sentence boundary indicates a sentence break in instances where sentence punctuation does not normally appear. For example, a sentence boundary may be used to separate the following two sentences:
 <sentence/>Pieza no reutilizable <sentence/>
 MOLDURA EXTERIOR DEL PARABRISAS.
The sentence boundary indicates that the phrases should be treated as separate sentences even though no punctuation appears in the source document.

Another annotation that may be included in the source document is a translation boundary. A translation boundary indicates a segment of the source document that is not to be translated into the target language. Translation boundaries can be nested such that a portion of a not-translated segment is translated in the target document. For example, the underlined text in the following sentence will be translated into the target language:
 Here's an <off> comment <on> interesting </on> another comment </off> problem.
where the word, "interesting" is translated because the "on" annotations defining the translation boundary are nested within the "off" annotations defining another translation boundary.

Formatting annotations may include space preservation around the annotations when the source document is translated into the target language. The translation engine 104 may insert extra spaces or delete space around words that may be undesirable in the target document. To preserve the spacing, the annotations are inserted with the desired spacing after the start tag and before the end tag. For example:
 <textart id="b111209e17-1-7">from P/W RL Fuse </textart>
indicates that there is no space before the word "from" and that there is a space after the word "fuse." In some embodiments, word class annotations, described above, do not include space preservation.

Using annotations, the annotations themselves can be preserved within the target document. By preserving the annotations, the translation engine 104 does not translate data occurring within the annotation itself. For example, an annotation may include a part name or a component name that is not to be translated into the target language. Referring to the previous example, the fragment, "b111209e17-1-7", will not be translated. The tag body, however, may be translated. In the above example, the phrase "from the P/W RL Fuse" will be translated into the target language.

In step 306, the source document comprising annotations and strings is received. The annotations include, for example, the XML tags described herein. The strings include the portions of the source document that are not annotated. The strings are processed by the translation engine 104 using statistical machine translation techniques.

In step 308, the language pair configuration set is selected. The language pair configuration set 212 is a group of configuration settings that defines the annotations associated with a source language and/or a target language. The configuration set 212 may additionally specify which annotations are to be removed from the target document after translation and which annotations are to be preserved in the target document. By editing the configuration sets, users of the translation engine 104 are able to define additional annotations and the behavior associated with the annotations. A configuration set may be accessed even if no TM database is available. An example of a configuration set 212 for documents in which the source language is English and the target language is empty is:

```
<config>
    <filters>
        <xml-filter src="eng" tgt=" ">
            <tags>
                <tag tag-name="seg" break="1" />
                <tag tag-name="unit" word-class="unit" />
                <tag tag-name="val" word-class="val" />
                <tag tag-name="num" word-class="num" />
                <tag tag-name="tr-on" hands-on="1" />
                <tag tag-name="tr-off" hands-off="1" />
                <tag tag-name="segment" no-swap="1" />
                <tag tag-name="textart"/>
                <tag tag-name="ptext" preserve-space="1" />
            </tags>
        </xml-filter>
        <xml-filter name="Auto Parts Catalog">
            <tag tag-name="unit" word-class="unit" />
            <tag tag-name="val" word-class="val" />
            <tag tag-name="num" word-class="num" />
        </xml-filter>
    </filters>
</config>
```

This exemplary configuration set can be used for any language pair where the source language is English. This configuration set also includes a second configuration set that is defined by a configuration set name, "Auto Parts Catalogue." The user can identify specific configuration sets by using configuration set names. As such, in some embodiments, the configuration set 212 is selected and/or specified by the user. The configuration set 212 may be selected according to the exemplary process depicted in FIG. 4.

In step 310, the source document is translated according to the annotations. Using the annotations, a more accurate and more fluent translation can be generated by the translation engine 104. The annotations can be adapted to technical jargon occurring in the source document. The annotations may also be used to insert objects such as images, charts, tables, graphs, or the like appearing in the source document into the target document.

Figure 4:
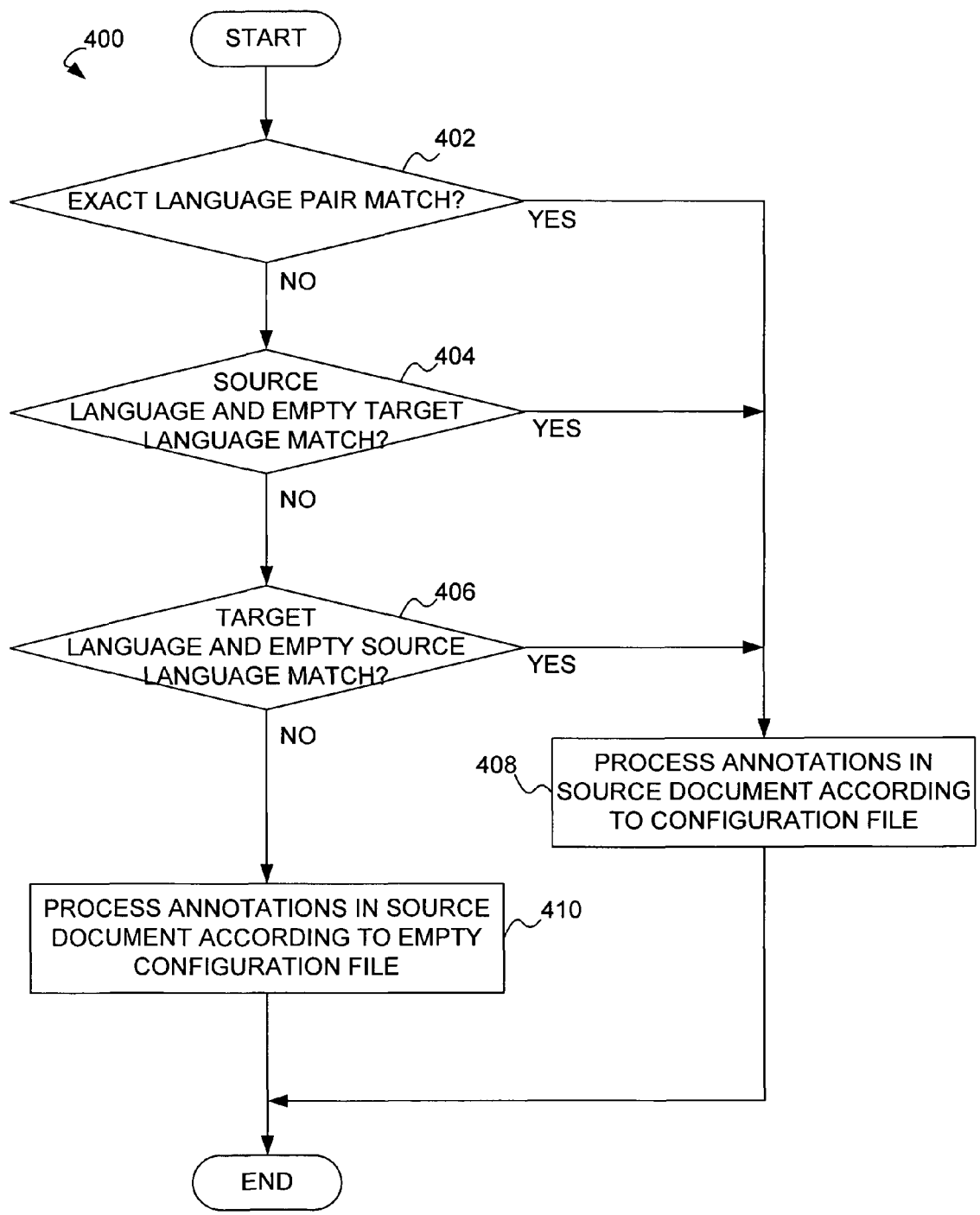
FIG. 4 depicts a flowchart illustrating an exemplary process for selecting a configuration set according to exemplary embodiments.

FIG. 4 depicts a flowchart illustrating an exemplary process 400 for selecting a configuration set, such as configuration set 212, according to exemplary embodiments. The configuration set may be stored in as a file. Further, a single file may contain more than one configuration set. In some embodiment, a configuration set may be identified by a configuration set name. The unique name allows a user to select a specific configuration set to be used for processing a document. Further, upon request, the system can supply the user with a list of all available configuration sets. The exemplary process 400 may be performed as step 306 by the translation engine 104, according to some embodiments.

In step 402, a determination is made as to whether a specific configuration set is selected by the user. In the above example, a user may select the configuration set for "Auto Parts Catalogue." If a configuration set is selected by the user, a second determination is made as to whether the configuration set is found in step 404. If the configuration set is not found in step 404, an error is reported to the user in step 406. If the configuration set is found, the annotations in the source document are processed according to the configuration set selected by the user in step 408.

If no specific configuration set is selected by the user in step 402, a determination as to whether a configuration set for the exact language pair of the source language and the target language exists in step 410. In a first further step, if the exact language pair does not exist, another determination may be made as to whether a configuration set having a matching source language and no target language exists. In a second further step, if no match for the source language is found, a determination may be made as to whether a configuration set having no source language and a matching target language exists.

In step 410, and the first and second further steps discussed above, if a matching configuration set is found, the annotations in the source document may be processed according to the matching configuration set, as described in step 408. If no matching configuration set exists, the annotations in the source document may be processed according to an empty configuration set. The empty configuration set allows the translation engine 104 to translate the source document as though the annotations are not present.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with various embodiments. Those skilled in the art are familiar with instructions, processor(s), and storage medium.

While various embodiments have been described above, it should be understood that they have been presented by way of example only, and not limitation. The scope of the present disclosure is in no way limited to the languages used to describe exemplary embodiments. Thus, the breadth and scope of a preferred embodiment should not be limited by any of the above-described exemplary embodiments.

What is claimed is:

1. A method for translating a document, comprising:
defining translation rules associated with annotations occurring in a translation memory database, wherein the translation rules comprise an output context;
integrating the translation rules in the translation memory database into statistical machine translation used by a translation engine, the integration including training the translation engine to recognize annotations in the translation memory database while performing statistical machine translation;
training the statistical machine translation of the translation engine using both the translation memory database and parallel segments to modify statistical probability values;
storing the statistical probability values modified during the training, the stored values for use in the statistical machine translation by the translation engine;
receiving a source document in a source language, the source document comprising a string and an annotated segment of text, the annotated segment of text comprising text and an instance of an annotation;
translating the source document as a whole using the translation engine without breaking the source document into segments that are translated according to whether a match appears in the translation memory database, the translation engine configured for:
identifying annotations and associated annotated segments of the text in the source document to be processed using the translation rules, and strings in the source document to be translated using statistical machine translation,
translating the identified strings in the source document using the statistical machine translation, and
processing the identified instances of the annotations and the associated annotated segments of text according to the translation rules using the translation memory database, at least one of the translation rules being associated with the annotation; and
generating a target document in a target language based on the translated source document and the translated text associated with the annotation.

2. The method recited in claim 1, wherein the annotation indicates a word class.

3. The method recited in claim 2, wherein the word class is associated with a value.

4. The method recited in claim 2, wherein the output context is associated with the word class.

5. The method recited in claim 1, wherein the annotation indicates a boundary.

6. The method recited in claim 5, wherein translating the text associated with the instance of the annotation comprises translating text occurring after the annotation separately from text occurring before the annotation.

7. The method recited in claim 1, wherein translating the text associated with the instance of the annotation comprises preserving a segment of the source document in the source language.

8. The method recited in claim 1, wherein translating the text associated with the instance of the annotation comprises preserving a number of spaces around the translated text associated with the annotation in the target document.

9. The method recited in claim 1, wherein translating the text associated with the instance of the annotation comprises preserving the annotation in the target document.

10. The method recited in claim 1, wherein the annotation comprises an extensible markup language tag.

11. The method recited in claim 1, wherein the annotation is associated with the source language.

12. The method recited in claim 1, wherein the annotation is associated with the target language.

13. The method recited in claim 1, further comprising training the translation engine to identify the annotation in the source document using annotated entries in the translation memory database.

14. The method recited in claim 1, wherein the associated annotated segment of text is adjacent the annotation.

15. The method recited in claim 1, wherein the translating of the identified strings using the translation engine trained using the translation memory is performed without reference to the annotation.

16. The method recited in claim 1, wherein the translation engine is further trained with the output context associated with the annotation.

17. The method recited in claim 1, wherein the output context comprises one or more words in the target document proximate to the annotation.

18. The method recited in claim 1, wherein the output context comprises a defined semantic behavior for at least one of a date, a number and a product name.

19. A system for translating a document, comprising:
  defined translation rules associated with annotations occurring in a translation memory database, wherein the translation rules comprise an output context;
  a communications interface configured to receive a source document in a source language, the source document comprising a string and an annotated segment of text, the annotated segment of text comprising text and an instance of an annotation;
  a statistical machine translation engine trained for statistical machine translation using both parallel segments, the annotation integrated into the parallel segments, and a translation memory comprising the annotation, to modify statistical probability values used in the statistical machine translation engine, the modified statistical probability values stored for use in the statistical machine translation by the statistical machine translation engine;
  a translation memory database including translation rules integrated into the statistical machine translation used by the statistical machine translation engine, the integration including training the statistical translation engine to recognize the annotations in the translation memory while performing the statistical machine translation; and
  a processor configured to translate the source document as a whole using the statistical machine translation engine without breaking the source document into segments that are translated according to whether a match appears in the translation memory database, the statistical machine translation engine configured to:
    identify the annotations and the associated annotated segments of the text in the source document to be processed using the translation rules, and the strings in the source document to be translated using statistical machine translation,
    translate the identified strings in the source document using statistical machine translation,
    process the identified instances of the annotations and the associated annotated segments of text according to the translation rules in the translation memory database, at least one of the translation rules being associated with the annotation, and
    generate a target document in a target language based on the translated string and the translated text associated with the annotation.

20. The system recited in claim 19, wherein the annotation indicates a word class.

21. The system recited in claim 20, wherein the word class is associated with a value.

22. The system recited in claim 20, wherein the output context is associated with the word class.

23. The system recited in claim 19, wherein the annotation indicates a boundary.

24. The system recited in claim 23, wherein the processor is configured to translate text occurring after the instance of the annotation separately from text occurring before the instance of the annotation.

25. The system recited in claim 19, wherein the processor is configured to preserve a segment of the source document in the source language.

26. The system recited in claim 19, wherein the processor is configured to preserve a number of spaces around the text associated with the annotation in the target document.

27. The system recited in claim 19, wherein the processor is configured to preserve the annotation in the target document.

28. The system recited in claim 19, wherein the annotation comprises an extensible markup language tag.

29. The system recited in claim 19, wherein the annotation is associated with the source language.

30. The system recited in claim 19, wherein the annotation is associated with the target language.

31. The system recited in claim 19, wherein the processor is further configured to train the statistical machine translation engine to identify the annotation in the source document using annotated entries in the translation memory database.

32. The system recited in claim 19, wherein the processor is configured to translate the identified string using the statistical machine translation engine without reference to the annotation.

33. A non-transitory computer readable storage medium having embodied thereon a computer program having instructions executable by a computer to perform a method for translating a document, the method comprising the steps:
  defining translation rules associated with annotations occurring in a translation memory database, wherein the translation rules comprise an output context;
  integrating the translation rules in the translation memory database into statistical machine translation used by a translation engine, the integration including training the translation engine to recognize annotations in the translation memory database while performing statistical machine translation;
  training the statistical machine translation of the translation engine using both the translation memory and parallel segments to modify statistical probability values;
  storing the statistical probability values modified during the training, the stored values for use in the statistical machine translation by the translation engine;
  receiving a source document in a source language, the source document comprising a string and an annotated segment of text, the annotated segment of text comprising text and an instance of an annotation;
  translating the source document as a whole using the translation engine without breaking the source document into segments that are translated according to whether a match appears in the translation memory database, the translation engine configured for:
    identifying annotations and associated annotated segments of the text in the source document to be processed using the translation rules, and strings in the source document to be translated using the statistical machine translation,
    translating the identified strings in the source document using the statistical machine translation, and
    processing the identified instances of the annotations and the associated annotated segments of text according to the translation rules using the translation memory database, at least one of the translation rules being associated with the annotation; and
  generating a target document in a target language based on the translated string and the translated text associated with the annotation.

34. The non-transitory computer readable storage medium recited in claim 33, wherein the annotation indicates a word class.

35. The non-transitory computer readable storage medium recited in claim 34, wherein the word class is associated with a value.

36. The non-transitory computer readable storage medium recited in claim 34, wherein the output context is associated with the word class.

37. The non-transitory computer readable storage medium recited in claim 33, wherein the annotation indicates a boundary.

38. The non-transitory computer readable storage medium recited in claim 37, further comprising an instruction executable by the computer for translating text occurring after the instance of the annotation separately from text occurring before the instance of the annotation.

39. The non-transitory computer readable storage medium recited in claim 33, further comprising an instruction executable by the computer for preserving a segment of the source document in the source language.

40. The non-transitory computer readable storage medium recited in claim 33, further comprising an instruction for preserving a number of spaces around the translated text associated with the annotation in the target document.

41. The non-transitory computer readable storage medium recited in claim 33, further comprising an instruction for preserving the annotation in the target document.

42. The non-transitory computer readable storage medium recited in claim 33, wherein the annotation comprises an extensible markup language tag.

43. The non-transitory computer readable storage medium recited in claim 33, wherein the annotation is associated with the source language.

44. The non-transitory computer readable storage medium recited in claim 33, wherein the annotation is associated with the target language.

45. The non-transitory computer readable storage medium recited in claim 33, further comprising an instruction executable by the computer training the translation engine to identify the annotation in the source document using annotated entries in the translation memory database.

46. The non-transitory computer readable storage medium recited in claim 33, wherein the translating of the identified string using the translation engine trained using the translation memory is performed without reference to the annotation.

\* \* \* \* \*